US012014686B2

(12) United States Patent
Lin et al.

(10) Patent No.: US 12,014,686 B2
(45) Date of Patent: Jun. 18, 2024

(54) DISPLAYS WITH REDUCED TEMPERATURE LUMINANCE SENSITIVITY

(71) Applicant: Apple Inc., Cupertino, CA (US)

(72) Inventors: Chin-Wei Lin, San Jose, CA (US); Shinya Ono, Santa Clara, CA (US); Zino Lee, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/970,842

(22) Filed: Oct. 21, 2022

(65) Prior Publication Data

US 2023/0042963 A1 Feb. 9, 2023

Related U.S. Application Data

(63) Continuation of application No. 17/317,128, filed on May 11, 2021, now Pat. No. 11,508,309.

(60) Provisional application No. 63/156,612, filed on Mar. 4, 2021.

(51) Int. Cl.
*G09G 3/3266* (2016.01)

(52) U.S. Cl.
CPC ... *G09G 3/3266* (2013.01); *G09G 2300/0809* (2013.01); *G09G 2300/0852* (2013.01); *G09G 2320/0233* (2013.01)

(58) Field of Classification Search
None
See application file for complete search history.

(56) References Cited

U.S. PATENT DOCUMENTS

| | | | |
|---|---|---|---|
| 8,564,507 | B2 | 10/2013 | Jang et al. |
| 8,593,445 | B2 | 11/2013 | Yamamoto et al. |
| 9,153,169 | B2 | 10/2015 | Yamashita et al. |
| 9,412,799 | B2 | 8/2016 | Chang et al. |
| 10,134,348 | B2 | 11/2018 | Cote et al. |
| 10,170,049 | B2 | 1/2019 | Ryu et al. |
| 10,902,778 | B2 | 1/2021 | Kim et al. |
| 10,964,264 | B1 | 3/2021 | Kim |
| 2005/0180083 | A1 | 8/2005 | Takahara et al. |
| 2007/0080905 | A1 | 4/2007 | Takahara |
| 2012/0013597 | A1 | 1/2012 | Han |

(Continued)

FOREIGN PATENT DOCUMENTS

| | | |
|---|---|---|
| CN | 111223447 A | 6/2020 |
| KR | 20080077919 A | 8/2008 |

(Continued)

*Primary Examiner* — Chineyere D Wills-Burns
*Assistant Examiner* — Amen W Bogale
(74) *Attorney, Agent, or Firm* — Treyz Law Group; Jason Tsai

(57) ABSTRACT

A display may include an array of pixels. Each pixel in the array may include a drive transistor, emission transistors, a data loading transistor, a gate voltage setting transistor, an initialization transistor, an anode reset transistor, a storage capacitor, and an optional current boosting capacitor. A data refresh may include a initialization phase, a threshold voltage sampling phase, and a data programming phase. The threshold voltage sampling phase can be substantially longer than the data programming phase to decrease a current sampling level during the threshold voltage sampling phase, which helps reduce the display luminance sensitivity to temperature variations.

13 Claims, 20 Drawing Sheets

(56) References Cited

U.S. PATENT DOCUMENTS

| | | | | |
|---|---|---|---|---|
| 2014/0327664 | A1* | 11/2014 | Kanda | G09G 3/3233 345/212 |
| 2015/0035734 | A1* | 2/2015 | Lee | G09G 3/3258 345/76 |
| 2015/0187281 | A1* | 7/2015 | Lee | G09G 3/3258 345/212 |
| 2016/0379552 | A1 | 12/2016 | Kim et al. | |
| 2017/0124941 | A1 | 5/2017 | Na et al. | |
| 2017/0148388 | A1 | 5/2017 | Gai et al. | |
| 2017/0213506 | A1* | 7/2017 | Shibusawa | G09G 3/3266 |
| 2017/0221420 | A1* | 8/2017 | Zhu | G09G 3/3233 |
| 2017/0249900 | A1* | 8/2017 | Xiang | G09G 3/3291 |
| 2018/0006263 | A1* | 1/2018 | Yoon | H10K 50/814 |
| 2018/0033365 | A1* | 2/2018 | Zhang | G09G 3/3233 |
| 2018/0061317 | A1* | 3/2018 | Morita | H10K 59/1213 |
| 2018/0108295 | A1* | 4/2018 | Ebisuno | H01L 27/1255 |
| 2018/0357964 | A1 | 12/2018 | Shin et al. | |
| 2019/0180688 | A1 | 6/2019 | Yang et al. | |
| 2019/0228706 | A1* | 7/2019 | Umeda | G09G 3/3258 |
| 2019/0392757 | A1* | 12/2019 | Jang | G09G 3/3233 |
| 2020/0135089 | A1* | 4/2020 | Ji | H01L 33/62 |
| 2020/0135118 | A1* | 4/2020 | Yin | G09G 3/3266 |
| 2020/0226978 | A1 | 7/2020 | Lin | |
| 2020/0343276 | A1 | 10/2020 | Sakata et al. | |
| 2021/0049965 | A1 | 2/2021 | Jeon et al. | |
| 2021/0312864 | A1 | 10/2021 | Zheng | |
| 2021/0351260 | A1 | 11/2021 | Kim | |
| 2021/0358392 | A1* | 11/2021 | Ikeda | G09G 3/2081 |
| 2021/0376041 | A1 | 12/2021 | Lee et al. | |
| 2022/0122534 | A1* | 4/2022 | Kim | G09G 3/3233 |
| 2022/0208110 | A1 | 6/2022 | Yu | |

FOREIGN PATENT DOCUMENTS

| | | | |
|---|---|---|---|
| KR | 20120009579 | A | 2/2012 |
| KR | 20140130630 | A | 11/2014 |
| KR | 20190067956 | A | 6/2019 |
| KR | 20200069094 | A | 6/2020 |
| KR | 20200087711 | A | 7/2020 |

* cited by examiner

DISPLAYS WITH REDUCED TEMPERATURE LUMINANCE SENSITIVITY

This application is a continuation of patent application Ser. No. 17/317,128, filed May 11, 2021, which claims the benefit of U.S. Provisional Patent Application No. 63/156,612, filed Mar. 4, 2021, which are hereby incorporated by reference herein in their entireties.

BACKGROUND

This relates generally to electronic devices with displays and, more particularly, to displays such as organic light-emitting diode (OLED) displays.

Electronic devices often include displays. For example, cellular telephones and portable computers typically include displays for presenting image content to users. OLED displays have an array of display pixels based on light-emitting diodes. In this type of display, each display pixel includes a light-emitting diode and associated thin-film transistors for controlling application of data signals to the light-emitting diode to produce light. It can be challenging to design a satisfactory OLED display for an electronic device.

SUMMARY

An electronic device may include a display having an array of display pixels. The display pixels may be organic light-emitting diode display pixels. Each display pixel may include at least an organic light-emitting diode (OLED) that emits light and associated thin-film transistors for controlling the operation of the pixel to help reduce temperature luminance sensitivity for the display.

In accordance with some embodiments, a display is provided that includes gate driver circuitry and an array of pixels coupled to the gate driver circuitry. At least one pixel in the array can include: a light-emitting diode having an anode terminal; a drive transistor coupled in series with the light-emitting diode, the drive transistor having a gate terminal, a first source-drain terminal, and a second source-drain terminal; a data loading transistor having a first source-drain terminal coupled to the gate terminal of the drive transistor, a second source-drain terminal coupled to a data line, and a gate terminal configured to receive a first scan signal from the gate driver circuitry; and a gate voltage setting transistor having a first source-drain terminal coupled to the gate terminal of the drive transistor, a second source-drain terminal configured to receive a reference voltage, and a gate terminal configured to receive a second scan signal from the gate driver circuitry. The gate driver circuitry can be configured to assert the second scan signal during a threshold voltage sampling phase and to assert the first scan signal during a data programming phase. The data programming phase can have a first duration, and the threshold voltage sampling phase can have a second duration that is greater than the first duration. The second duration can be at least five to twenty times longer than the first duration.

The at least one pixel can further include an anode reset transistor having a first source-drain terminal coupled to the anode terminal of the light-emitting diode, a second source-drain terminal configured to receive an anode reset voltage, and a gate terminal configured to receive a third scan signal from the gate driver circuitry. The at least one pixel can further include an initialization transistor having a first source-drain terminal coupled to the second source-drain terminal of the drive transistor, a second source-drain terminal configured to receive an initialization voltage, and a gate terminal configured to receive the third scan signal. The gate driver circuitry can be configured to assert the second scan signal and the third scan signal during an initialization phase. The at least one pixel can further include a first emission transistor coupled between a positive power supply line and the first source-drain terminal of the drive transistor and a second emission transistor coupled between the second source-drain terminal of the drive transistor and the anode terminal. The first and second emission transistors can have gate terminals configured to receive an emission signal from the gate driver circuitry, where the gate driver circuitry is configured to assert the emission signal during the threshold voltage sampling phase. All of the transistors within the at least one pixel can be semiconducting oxide transistors.

In accordance with some embodiments, a method of operating a display is provided. The display can include gate driver circuitry and an array of pixels each of which includes at least a light-emitting diode, a drive transistor, a data loading transistor, a gate voltage setting transistor, and a storage capacitor. The method can include: during a threshold voltage sampling phase, sampling a threshold voltage of the drive transistor onto the storage capacitor by asserting, with the gate driver circuitry, a second scan signal to activate the gate voltage setting transistor; and during a data programming phase, loading data onto the storage capacitor by asserting, with the gate driver circuitry, a first scan signal to activate the data loading transistor. The data programming phase can occur after the threshold voltage sampling phase during a data refresh operation. The threshold voltage sampling phase can have a duration that is at least ten to twenty times longer than the duration of the data programming phase.

The method can further include resetting an anode of the light-emitting diode by asserting, with the gate driver circuitry, a third scan signal to activate the anode reset transistor during an initialization phase. The method can further include applying a bias voltage to the drive transistor by asserting, with the gate driver circuitry, the third scan signal to activate the initialization transistor during the initialization phase. Each pixel can include one or two emission transistors. At least one of the emission transistors can be deactivated during the initialization phase and activated during the threshold voltage sampling phase.

In accordance with some embodiments, a display pixel is provided that includes: a light-emitting diode having an anode terminal; a drive transistor coupled in series with the light-emitting diode, the drive transistor having a first source-drain terminal, a second source-drain terminal, and a gate terminal; a data loading transistor having a first source-drain terminal coupled to the gate terminal of the drive transistor, a second source-drain terminal coupled to a data line, and a gate terminal configured to receive a first scan signal; a gate voltage setting transistor having a first source-drain terminal coupled to the gate terminal of the drive transistor, a second source-drain terminal configured to receive a reference voltage, and a gate terminal configured to receive a second scan signal; an emission transistor coupled in series with the light-emitting diode and the drive transistor, the emission transistor having a gate terminal configured to receive an emission signal; and an anode reset transistor having a first source-drain terminal coupled to the anode terminal, a second source-drain terminal configured to receive a reset voltage, and a gate terminal configured to receive a third scan signal.

The display pixel can be operable in: (1) an initialization phase during which the gate voltage setting transistor and the anode reset transistor are activated; (2) a threshold voltage sampling phase during which the gate voltage setting transistor and the emission transistor are activated; and (3) a data programming phase during which the data loading transistor is activated. The threshold voltage sampling phase can have a duration selected to mitigate an amount by which the luminance varies as a function of temperature (i.e., to mitigate a temperature luminance sensitivity for the display).

DETAILED DESCRIPTION

Figure 1:
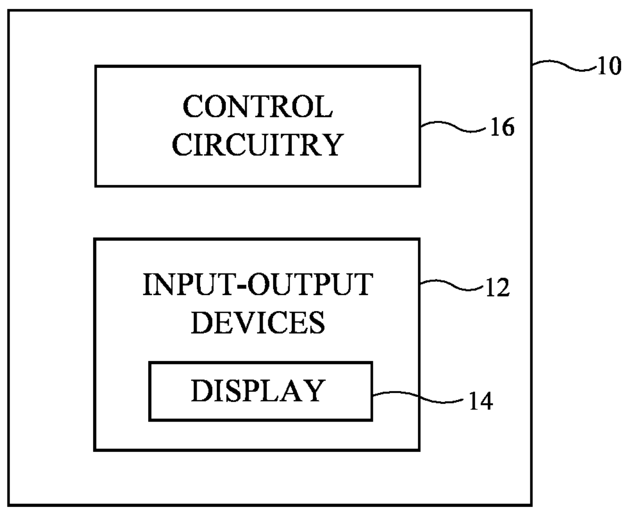
FIG. 1 is a diagram of an illustrative electronic device having a display in accordance with some embodiments.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, application processors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14. Device 10 may be a tablet computer, laptop computer, a desktop computer, a display, a cellular telephone, a media player, a wristwatch device or other wearable electronic equipment, or other suitable electronic device.

Display 14 may be an organic light-emitting diode display or may be a display based on other types of display technology. Configurations in which display 14 is an organic light-emitting diode (OLED) display are sometimes described herein as an example. This is, however, merely illustrative. Any suitable type of display may be used in device 10, if desired.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
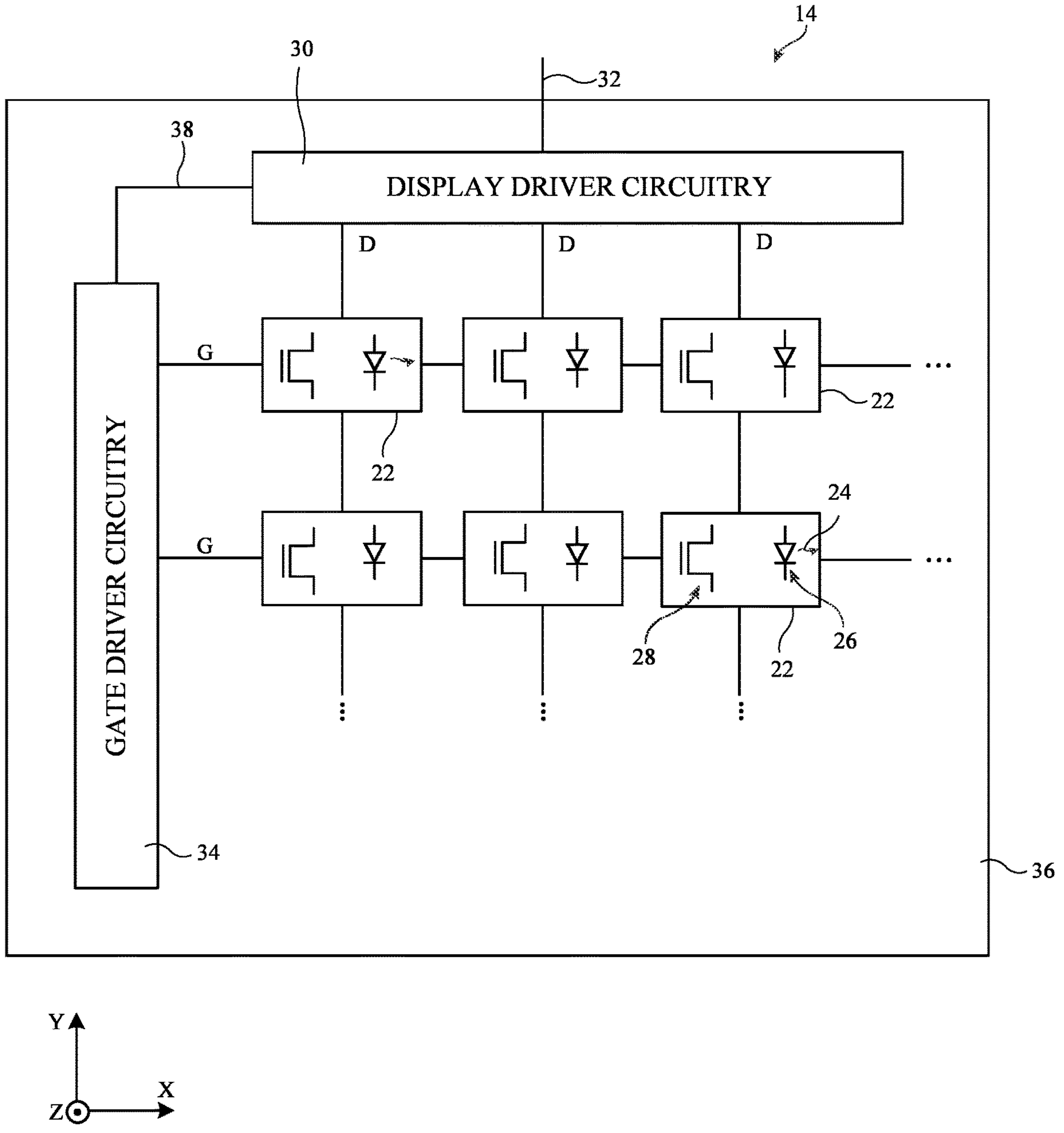
FIG. 2 is a diagram of an illustrative display having an array of organic light-emitting diode (OLED) display pixels in accordance with some embodiments.

A top view of a portion of display 14 is shown in FIG. 2. As shown in FIG. 2, display 14 may have an array of pixels 22 formed on a substrate 36. Substrate 36 may be formed from glass, metal, plastic, ceramic, porcelain, or other substrate materials. Pixels 22 may receive data signals over signal paths such as data lines D (sometimes referred to as data signal lines, column lines, etc.) and may receive one or more control signals over control signal paths such as horizontal control lines G (sometimes referred to as gate lines, scan lines, emission lines, row lines, etc.). There may be any suitable number of rows and columns of pixels 22 in display 14 (e.g., tens or more, hundreds or more, or thousands or more).

Each pixel 22 may have a light-emitting diode 26 that emits light 24 under the control of a pixel control circuit formed from thin-film transistor circuitry such as thin-film transistors 28 and thin-film capacitors). Thin-film transistors 28 may be polysilicon thin-film transistors, semiconducting oxide thin-film transistors such as indium zinc gallium oxide transistors, or thin-film transistors formed from other semiconductors. Pixels 22 may contain light-emitting diodes of different colors (e.g., red, green, and blue) to provide display 14 with the ability to display color images.

Display driver circuitry 30 may be used to control the operation of pixels 22. The display driver circuitry 30 may be formed from integrated circuits, thin-film transistor circuits, or other suitable electronic circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D (e.g., data lines that run down the columns of pixels 22) while issuing clock signals and other control signals to supporting display driver circuitry such as gate driver circuitry 34 over path 38. If desired, display driver circuitry 30 may also supply clock signals and other control signals to gate driver circuitry 34 on an opposing edge of display 14 (e.g., the gate driver circuitry may be formed on more than one side of the display pixel array).

Gate driver circuitry 34 (sometimes referred to as horizontal line control circuitry or row driver circuitry) may be implemented as part of an integrated circuit and/or may be implemented using thin-film transistor circuitry. Horizontal/row control lines G in display 14 may carry gate line signals (scan line control signals), emission enable control signals, and/or other horizontal control signals for controlling the pixels of each row. There may be any suitable number of horizontal control signals per row of pixels 22 (e.g., one or more row control lines, two or more row control lines, three or more row control lines, four or more row control lines, five or more row control lines, etc.).

Figure 3:
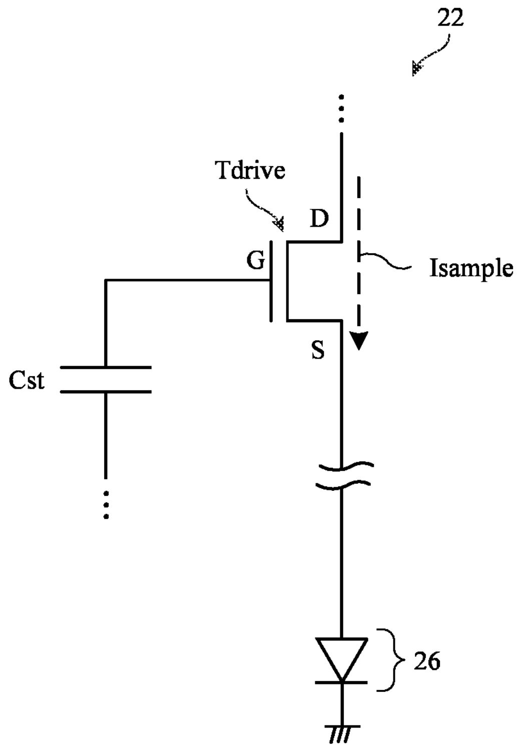
FIG. 3 is a diagram illustrating a sampling current during a threshold voltage sampling phase in accordance with some embodiments.

FIG. 3 is a diagram showing a portion of display pixel 22. As shown in FIG. 3, pixel 22 may include at least a drive transistor such as transistor Tdrive, a storage capacitor such as capacitor Cst, and light-emitting diode 26. Pixel 22 may also include other transistors such as data loading transistors, emission control transistors, anode reset transistors, initialization transistors, etc. Drive transistor Tdrive is configured to provide a drive current to diode 26 and has a gate (G) terminal, a drain (D) terminal, and a source (S) terminal. The terms "source" and "drain" terminals that are used to describe current-conducting terminals of a transistor are sometimes interchangeable and may be referred to herein as "source-drain" terminals. Storage capacitor Cst may be coupled to the gate terminal of transistor Tdrive and may be configured to store a data signal value for pixel 22.

In practice, display pixel 22 may be subject to process, voltage, and temperature (PVT) variations. Due to such variations, transistor threshold voltages between different display pixels 22 can vary. Variations in the threshold voltage of the drive transistor can cause different display pixels 22 to produce amounts of light that do not match the desired image. In an effort to mitigate threshold voltage variations, display pixel 22 of the type shown in FIG. 3 may be operable to support in-pixel threshold voltage (Vt) compensation. In-pixel threshold voltage compensation operations, sometimes referred to as in-pixel Vt canceling operations, may generally include at least an initialization phase, a Vt sampling phase, a data programming phase, and an emission phase (in that order). During the Vt sampling phase, the threshold voltage of transistor Tdrive may be sampled using storage capacitor Cst. Subsequently, during the emission phase, an emission current flowing from transistor Tdrive into the light-emitting diode 26 has a term that cancels out with the sampled Vt level. As a result, the emission current will be independent of the drive transistor threshold voltage Vt and will therefore be less sensitive to Vt variations at the drive transistor. During the Vt sampling phase, a sampling current can flow through transistor Tdrive as indicated by current Isample.

The sampling current level Isample may affect a display's sensitivity to temperature. For example, a display's luminance can vary as a function of temperature. Such variation is defined herein as temperature luminance sensitivity. Experiments have shown that higher sampling current levels translate to greater temperature luminance sensitivity especially at low gray levels, whereas lower sampling current levels translate to lower temperature luminance sensitivity for low gray levels. Temperature luminance sensitivity may be defined as a percentage change in display luminance in response to a predetermined change in temperature. It is generally desirable to keep the temperature luminance sensitivity as close to zero as possible to minimize the display's sensitivity to temperature.

Figure 4:
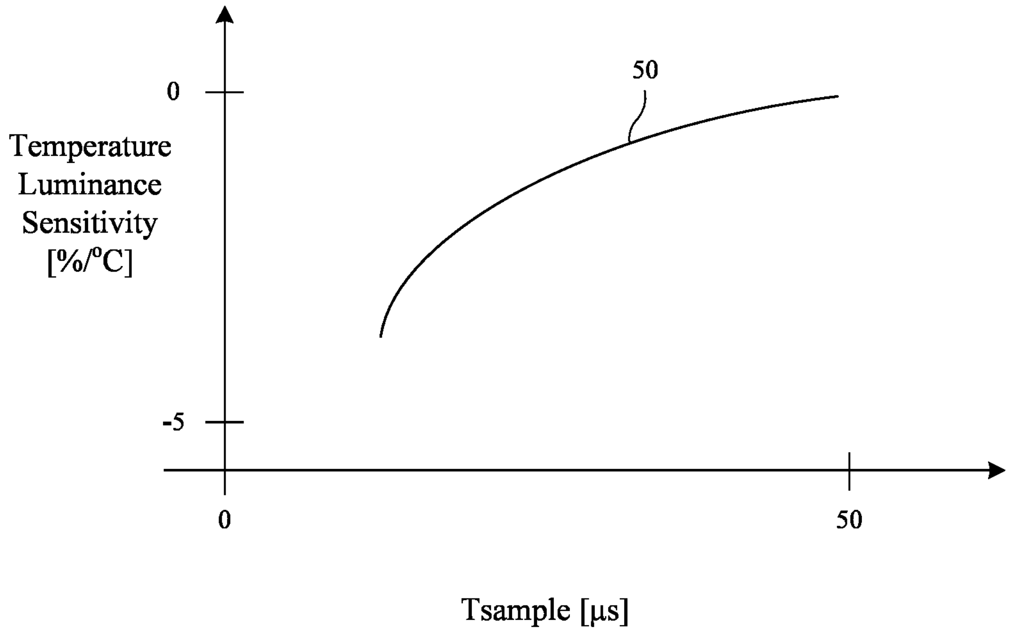
FIG. 4 is a plot showing how temperature luminance sensitivity in a display varies as a function of threshold voltage sampling duration in accordance with some embodiments.

In accordance with an embodiment, sampling current Isample can be reduced by lengthening the duration of the Vt sampling phase. FIG. 4 plots a characteristic curve 50 showing how temperature luminance sensitivity in a display varies as a function of threshold voltage sampling duration Tsample. As shown in FIG. 4, curve 50 approaches 0%/° C. as the threshold voltage sampling time Tsample is increased. In other words, increasing the Tsample duration can help reduce a display's sensitivity to temperature. In conventional display pixel architectures, the Vt sampling duration is, however, limited by the duration of the data programming period (i.e., the data programming period is typically limited to one row time, which is set by the performance requirements of the display).

Figure 5A:
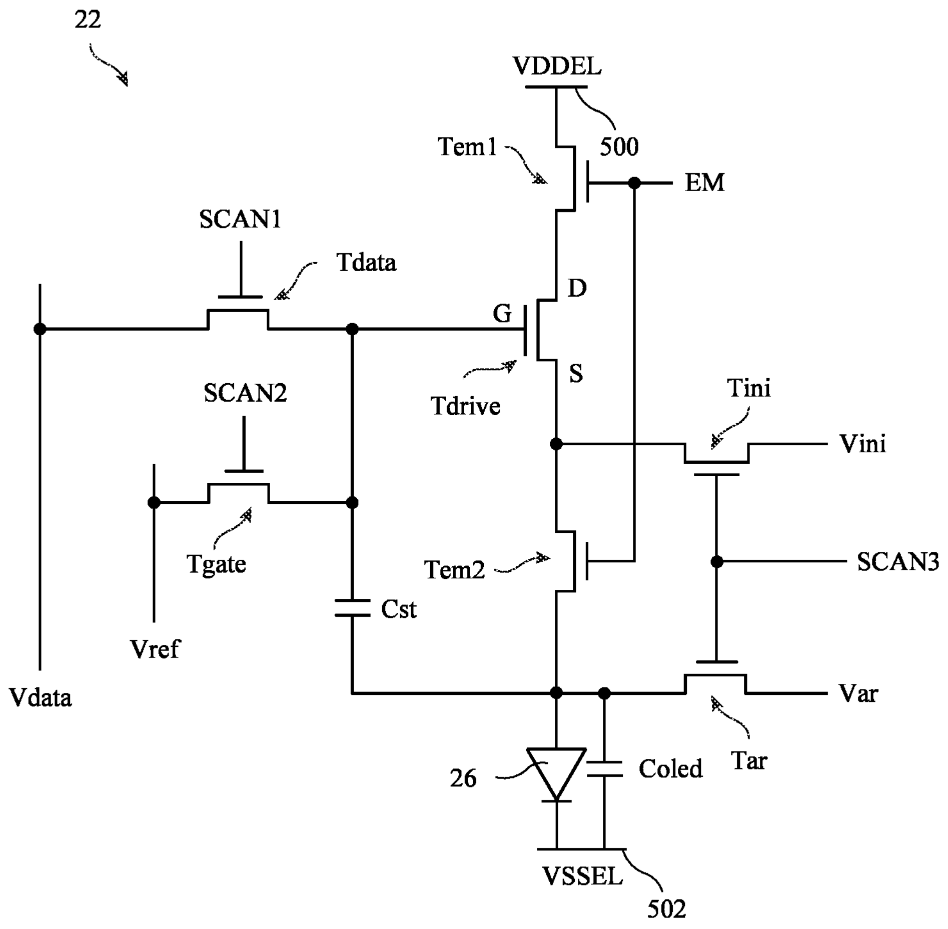
FIG. 5A is a circuit diagram of an illustrative display pixel operable to perform an extended threshold voltage sampling phase separately from a data programming phase in accordance with some embodiments.

In accordance with an embodiment, FIG. 5A is a circuit diagram of an illustrative display pixel 22 operable to reduce temperature luminance sensitivity by separating the threshold voltage sampling phase from the data programming phase and extending the duration of the threshold voltage sampling phase to reduce temperature luminance sensitivity. As shown in FIG. 5A, display pixel 22 may include a light-emitting element such as an organic light-emitting diode 26, a capacitor such as storage capacitor Cst, and thin-film transistors such a drive transistor Tdrive, a gate-voltage-setting transistor Tgate, a data loading transistor Tdata, an initialization transistor Tini, an anode reset transistor Tar, and emission control transistors Tem1 and Tem2. Emission control transistors Tem1 and Tem2 are sometimes referred to as emission transistors. At least some or all of the transistors within pixel 22 are semiconducting oxide transistors. Semiconducting oxide transistors are defined as thin-film transistors having a channel region formed from semiconducting oxide material (e.g., indium gallium zinc oxide or IGZO, indium tin zinc oxide or ITZO, indium gallium tin zinc oxide or IGTZO, indium tin oxide or ITO, or other semiconducting oxide material) and are generally considered n-type (n-channel) transistors.

A semiconducting oxide transistor is notably different than a silicon transistor (i.e., a transistor having a polysilicon channel region deposited using a low temperature process sometimes referred to as LTPS or low-temperature polysilicon). Semiconducting oxide transistors exhibit lower leakage than silicon transistors, so implementing at least some of the transistors within pixel 22 can help reduce flicker (e.g., by preventing current from leaking away from the gate terminal of drive transistor Tdrive).

If desired, at least some of the transistors within pixel 22 may be implemented as silicon transistors such that pixel 22 has a hybrid configuration that includes a combination of semiconducting oxide transistors and silicon transistors (e.g., n-type LTPS transistors or p-type LTPS transistors). In yet other suitable embodiments, pixel 22 may include additional initialization transistors for apply an initialization or reference voltage to one or more internal nodes within pixel 22. As another example, display pixel 22 may further include additional switching transistors (e.g., one or more additional semiconducting oxide transistors or silicon transistors) for applying one or more bias voltages for improving the performance or operation of pixel 22. Illustrative configurations in which pixel 22 includes only semiconducting oxide transistors and no silicon transistors may sometimes be described herein as an example.

Drive transistor Tdrive has a gate terminal G, a drain terminal D (sometimes referred to as a first source-drain terminal), and a source terminal S (sometimes referred to as a second source-drain terminal). Transistor Tdrive, emission control transistors Tem1 and Tem2, and light-emitting diode 26 are coupled in series between positive power supply line 500 and ground power supply line 502. Light-emitting diode 26 may have an associated diode capacitance Coled. Emission transistors Tem1 and Tem2 each have a gate terminal configured to receive a shared emission control signal EM. This example in which transistors Tem1 and Tem2 receive a common emission signal is merely illustrative. In other embodiments, transistors Tem1 and Tem2 can receive different emission control signals.

A positive power supply voltage VDDEL may be supplied to positive power supply terminal 500, whereas a ground power supply voltage VSSEL may be supplied to ground power supply terminal 502. Positive power supply voltage VDD may be 3 V, 4 V, 5 V, 6 V, 7 V, 2 to 8 V, greater than 6 V, greater than 8 V, greater than 10 V, greater than 12 V, 6-12 V, 12-20 V, or any suitable positive power supply voltage level. Ground power supply voltage VSSEL may be 0 V, −1 V, −2 V, −3 V, −4 V, −5 V, −6V, −7 V, less than 2 V, less than 1 V, less than 0 V, or any suitable ground or negative power supply voltage level. During emission phase, signals EM1 and EM2 are asserted to turn on transistors Tem1 and Tem2, which allows current to flow from drive transistor Tdrive to diode 26. The degree to which drive transistor Tdrive is turned on controls the amount of current flowing from terminal 500 to terminal 502 through diode 26 and therefore the amount of emitted light from display pixel 22.

In the example of FIG. 5A, storage capacitor Cst may be coupled between the gate terminal of drive transistor Tdrive and the anode (A) terminal of diode 26. Data loading transistor Tdata may have a first source-drain terminal coupled to the gate terminal of transistor Tdrive, a second source-drain terminal coupled to a data line (e.g., a column line carrying data signal Vdata), and a gate terminal configured to receive a first scan control signal SCAN1. Transistor Tgate may have a first source-drain terminal coupled to the gate terminal of transistor Tdrive, a second source-drain terminal coupled to a reference voltage Vref via a reference voltage line (e.g., a column line carrying reference voltage Vref), and a gate terminal configured to receive a first scan control signal SCAN1. Transistor Tgate that is operable to pass reference voltage Vref onto the gate terminal to Tdrive may therefore sometimes be referred to as a gate-voltage-setting transistor. Voltage Vref may be a fixed voltage level that is equal to VDDEL, less than VDDEL, or some other voltage level between VSSEL and VDDEL.

Transistor Tini may have a first source-drain terminal coupled to the source terminal of Tdrive, a second source-drain terminal configured to receive an initialization voltage Vini via an initialization voltage line (e.g., a column line carrying initialization voltage Vini), and a gate terminal configured to receive a third scan control signal SC3. Transistor Tar may have a first source-drain terminal coupled to the anode terminal of diode 26 (sometimes referred to as the anode electrode), a second source-drain terminal configured to receive an anode reset voltage via an anode reset voltage line (e.g., a column line carrying anode reset voltage Var), and a gate terminal configured to receive third scan control signal SC3). Diode 26 has a cathode terminal (sometimes referred to as the cathode electrode) coupled to VSSEL ground power supply line 502 (sometimes referred to as the common power supply line).

Voltages Var and Vini can sometimes be referred to collectively as reset voltages. Thus, transistors Tar and Vini can sometimes be referred to collectively as reset transistors or initialization transistors. Voltages Var and Vini may be a fixed voltage level that is less than VDDEL, equal to VSSEL, or some other intermediate voltage level between VSSEL and VDDEL. If desired, voltages Var and Vini can be adjustable voltages that are dynamically varied during the operation of pixel 22. In certain embodiments, voltage Var can be equal to voltage Vini. In other embodiments, voltage Var can be different than voltage Vini. Scan control signals SCAN1, SCAN2, and SCAN3 (sometimes referred to as scan signals) may be provided over row control lines (see lines G in FIG. 2).

Figure 5B:
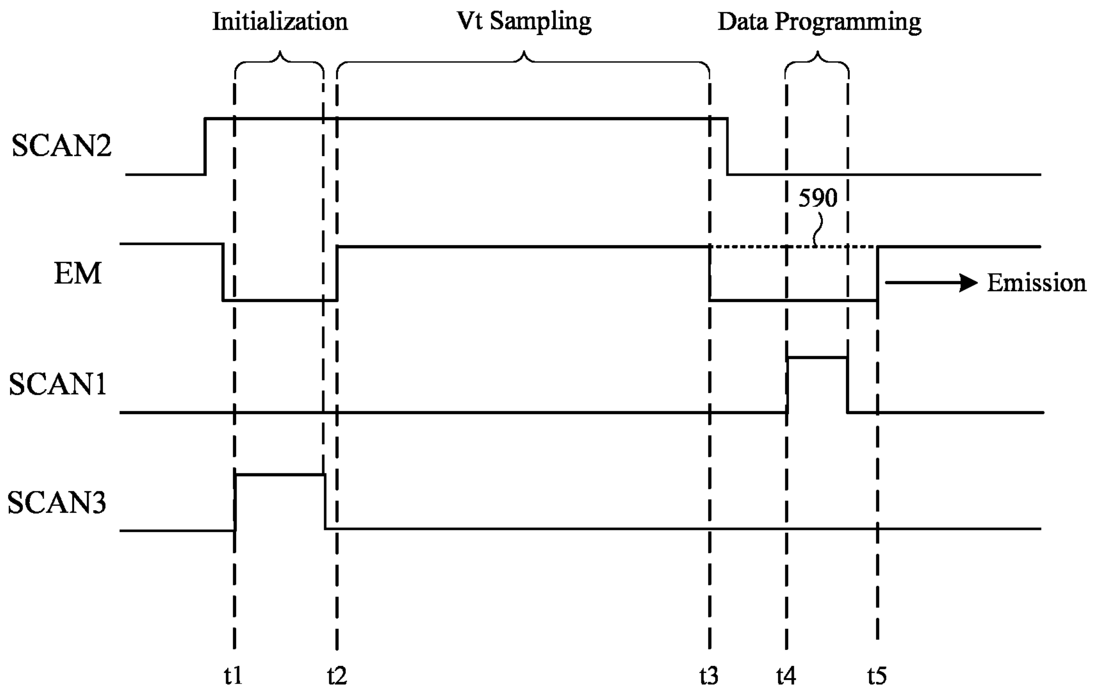
FIG. 5B is a timing diagram illustrating the behavior of relevant control waveforms during a refresh operation of the pixel shown in FIG. 5A in accordance with some embodiments.

FIG. 5B is a timing diagram illustrating the operation of display pixel 22 of the type shown in FIG. 5A. Prior to time t1, scan signal SCAN2 can be asserted (e.g., driven high) to activate (turn on) transistor Tgate, and emission signal EM can be deasserted (e.g., driven low) to turn off transistors Tem1 and Tem2. Activating transistor Tgate drives the gate terminal of transistor Tdrive to the reference voltage level Vref. At time t1, scan signal SCAN3 is temporarily pulsed high to turn on transistors Tini and Tar. Activating transistor Tini drives the source node of transistor Tdrive to voltage Vini, whereas activating transistor Tar drives the OLED anode terminal to voltage Var. While signal SCAN3 is asserted, the gate-to-source voltage Vgs of transistor Tdrive will therefore be biased to (Vref−Vini). This period during which the Vgs of transistor Tdrive is initialized to a known voltage difference and where the anode terminal is reset to voltage Var is sometimes referred to as the initialization phase. Signal SCAN3 is deasserted at the end of the initialization phase to turn off transistors Tini and Tar.

In certain situations, the drive transistor threshold voltage Vt can vary, such as when display 14 is transitioning from a black image to a white image or when transitioning from one gray level to another. This shifting in Vt (sometimes referred to herein as thin-film transistor "hysteresis") can cause a reduction in luminance, which is otherwise known as "first frame dimming" For example, the saturation current Ids waveform as a function of Vgs of the drive transistor for a black frame might be slightly offset from the target Ids waveform as a function of Vgs of the drive transistor for a white frame. To help mitigate this offset, a suitable bias voltage may be directly applied to a terminal of the drive transistor during non-emission phases. In the example of FIG. 5A, the application of voltage Vini onto the source terminal of transistor Tdrive during the initialization phase can help mitigate hysteresis and improve first frame response and is sometimes referred to as an "on-bias stress" operation.

At time t2, emission signal EM is asserted (e.g., driven high) to turn on transistors Tem1 and Tem2. Turning on transistor Tem1 drives the drain terminal of transistor Tdrive up to VDDEL, which will result in the source terminal of transistor Tdrive to charge up to one Vt below the Vref level at the gate of transistor Tdrive. In other words, the source terminal of transistor Tdrive will charge up to (Vref−Vt). Since transistor Tem2 is also turned on during this time, the OLED anode terminal will likewise be charged up to (Vref−Vt). Thus, the voltage sampled across storage capacitor during this time will be equal to (Vref−[Vref−Vt]), which is equal to Vt. At time t3, emission signal EM is deasserted (e.g., driven low). This time period from t2 to t3 during which Vt is sampled across storage capacitor Cst is referred to as the Vt sampling phase.

At time t4, scan signal SCAN1 is pulsed high to turn on transistor Tdata. Activating transistor Tdata drives the gate terminal of transistor Tdrive to data voltage Vdata corresponding to a new data signal value for pixel 22. Since transistors Tem2 and Tar are both turned off at this time, the anode terminal is a high impedance node so capacitor Cst cannot discharge (e.g., the voltage across capacitor Cst will remain equal to Vt even though the drive transistor gate terminal will be driven to a new Vdata level). This time period during which transistor Tdata is activated to load in data voltage Vdata is referred to as the data programming phase. If desired, emission signal EM can optionally be asserted through the data programming phase to allow a current that is proportional to Vdata to flow through emission transistors Tem1 and Tem2 during the period from t3 to t5 (see alternate waveform 590).

At time t5, emission signal EM is asserted to begin the emission phase during which diode 26 can emit an amount of light that is proportional to voltage Vdata. During the emission phase, the resulting Vgs of transistor Tdrive will be equal to [Vdata−(Vref−Vt)]. Since the final emission current is proportional to Vgs minus Vt, the emission current will be independent of Vt since (Vgs−Vt) will be equal to (Vdata−Vref+Vt−Vt), where Vt cancels out. This type of operating scheme where the drive transistor threshold voltage is internally sampled and canceled out in this way is sometimes referred to as in-pixel threshold voltage compensation. The time period from t1 to t5, which includes the initialization phase, Vt sampling phase, and data programming phase, is sometimes referred to as a data refresh period.

To minimize a display's sensitivity to temperature variations, the Vt sampling phase duration can be extended, which reduces the sampling current level. Decoupling the Vt sampling phase from the data programming phase allows the Vt sampling phase duration to be lengthened independently from the data programming phase duration, which is typically limited to one row time as set by the performance requirements of the display. In some embodiments, the Vt sampling phase duration (i.e., the time period from t2 to t3) can be ten to twenty times longer than the data programming phase duration (i.e., the pulse width of SCAN1). In general, the Vt sampling phase duration can be at least 2 times, 5 times, 2-5 times, 10 times, 5-10 times, 10-20 times, or more than 20 times longer than the data programming phase duration. The duration of the Vt sampling phase can also be dynamically adjusted depending on the degree to which display temperature luminance sensitivity needs to be suppressed. In general, a longer Vt sampling phase duration would reduce the temperature luminance sensitivity.

In some embodiments, display 14 that includes pixels 22 may optionally be configured to support low refresh rate operation. Operating display 14 using a relatively low refresh rate (e.g., a refresh rate of 1 Hz, 2 Hz, 1-10 Hz, less than 30 Hz, less than 60 Hz, or other low rate) may be suitable for applications outputting content that is static or nearly static and/or for applications that require minimal power consumption.

Figure 6:
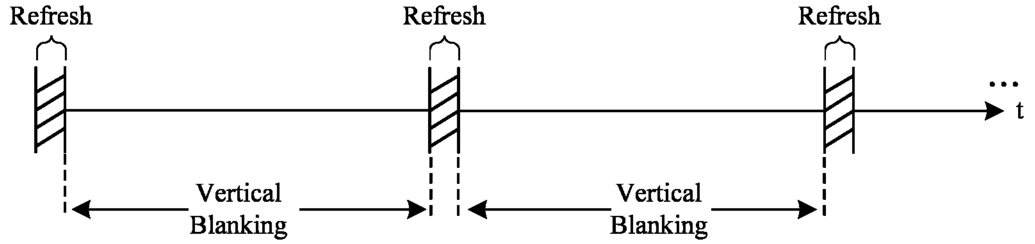
FIG. 6 is a diagram of a low refresh rate display driving scheme in accordance with some embodiments.

FIG. 6 is a diagram of a low refresh rate display driving scheme. As shown in FIG. 6, display 14 may alternate between a short data refresh period and an extended vertical blanking period. As an example, each data refresh period may be approximately 16.67 milliseconds (ms) in accordance with a 60 Hz data refresh operation, whereas each vertical blanking period may be approximately 1 second so that the overall refresh rate of display 14 is lowered to 1 Hz. Configured as such, the blanking duration can be adjusted to tune the overall refresh rate of display 14. For example, if the blanking duration was tuned to half a second, the overall refresh rate would be increased to approximately 2 Hz. In low refresh rate driving schemes, the vertical blanking time may (for example) be at least two times, at least ten times, at least 30 times, or at least 60 times longer than the data refresh time.

As shown in FIG. 5A, light-emitting diode 26 may have an associated capacitance Coled. When using pixel 22 to output low grey levels, the emission current is relatively small, so charging capacitance Coled can take a fairly long time. Such low grey level flicker is typically not perceivable at high refresh rates. At lower refresh rates, however, low grey level flicker can be observed due to low frequency brightness changes during every refresh period. To help improve low fresh rate flicker and reduce luminance variation, it may be desirable to perform one or more anode resets during the vertical blanking period.

Figure 5C:
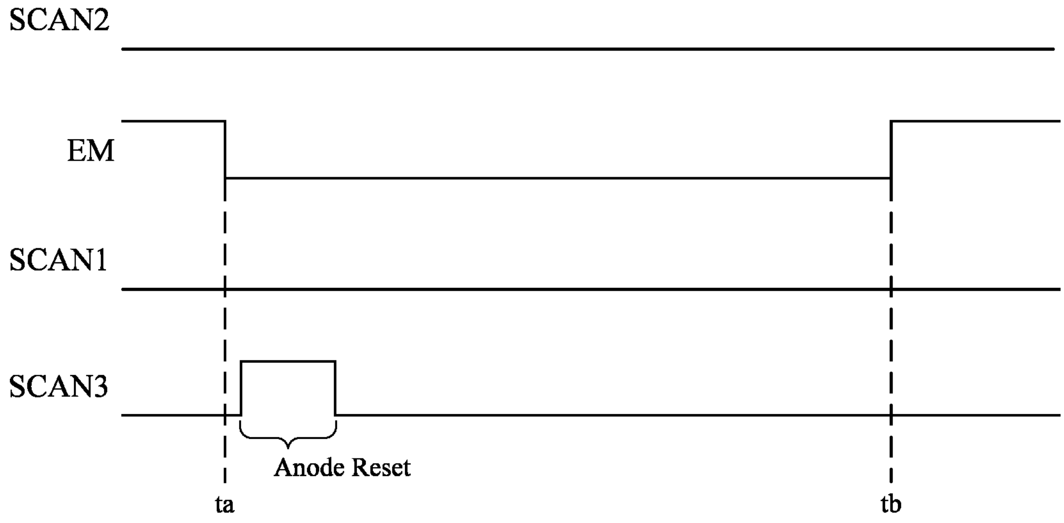
FIG. 5C is a timing diagram illustrating the behavior of relevant control waveforms during a vertical blanking operation of the pixel shown in FIG. 5A in accordance with some embodiments.

FIG. 5C is a timing diagram illustrating the behavior of relevant signal waveforms to control pixel 22 of FIG. 5A during a vertical blanking period. Prior to time ta, emission signal EM may be deasserted (e.g., driven low) to temporarily halt emission. After time ta, signal SCAN3 can be pulsed to temporarily activate transistors Tar and Tini. Activating transistor Tar will drive the OLED anode terminal to the anode reset voltage level Var. At time tb, emission signal EM may be asserted to resume emission. The duration from time ta to tb should be equal to the active refresh period from time t1 to t5. Such anode reset can be performed every 8 ms, every 4 ms, every 2 ms, or at other suitable intervals during the vertical blanking period depending on when the system can update data values. Performing multiple anode resets during the vertical blanking period can help mitigate low grey level flicker and luminance variation when display 14 is operating at low refresh rates.

The example of FIG. 5A in which pixel 22 includes one capacitor Cst is merely illustrative. The drive current of pixel 22 (e.g., the current flowing through drive transistor Tdrive during emission) in FIG. 5A is proportional to [Coled/(Cst+Coled)]. If the OLED capacitance Coled is small relative to Cst, then the drive current will be attenuated.

Figure 7:
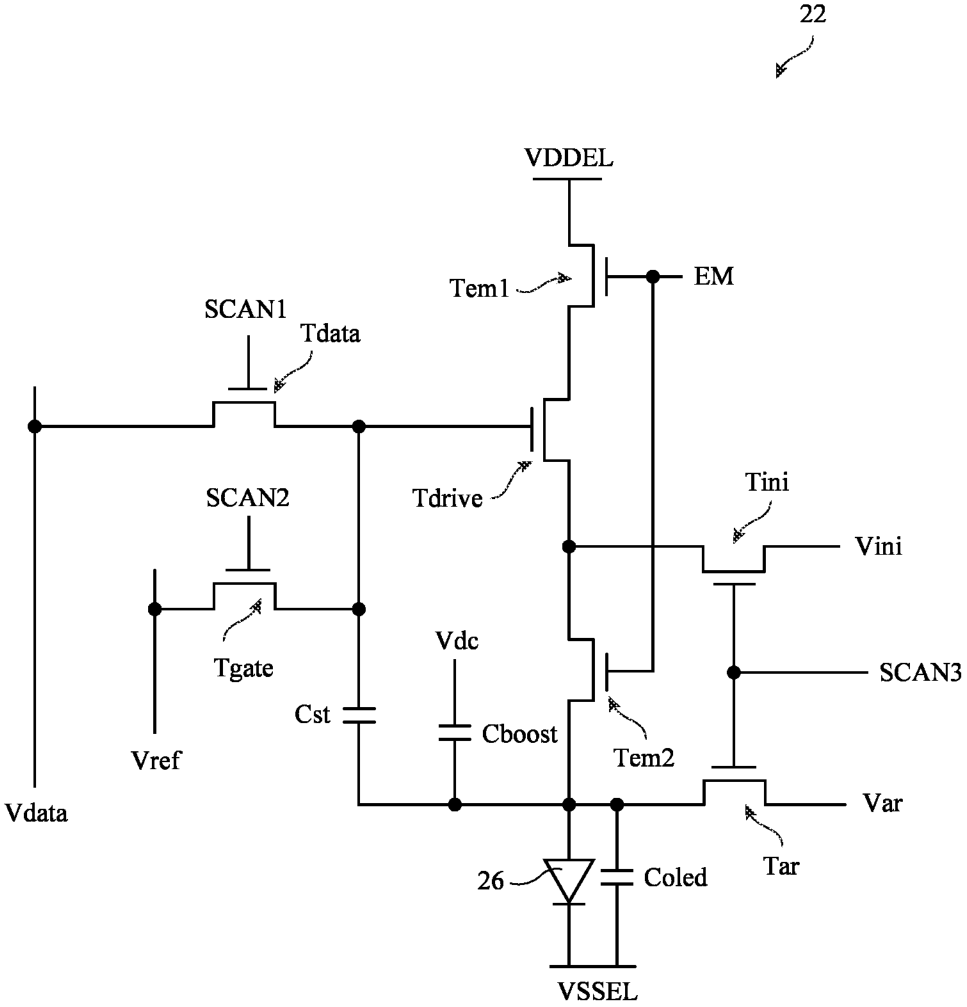
FIG. 7 is a circuit diagram of an illustrative display pixel having an additional current boosting capacitor in accordance with some embodiments.

FIG. 7 illustrates another suitable embodiment of pixel 22 that includes an additional capacitor Cboost. As shown in FIG. 7, capacitor Cboost has a first terminal coupled to the OLED anode terminal and a second terminal coupled to a DC voltage level Vdc. Voltage Vdc can be shorted to VDDEL, VSSEL, Vref, Var, Vini, or other available/existing voltage within pixel 22. The structure and function of the remainder of pixel 22 of FIG. 7 is identical to that of FIG. 5A and need not be reiterated for the sake of clarity. The data refresh operation of FIG. 5B and the vertical blanking anode reset operation of FIG. 5C can also be applied to pixel 22 of FIG. 7. Configured in this way, the drive current of pixel 22 of FIG. 7 will be proportional to [(Coled+Cboost)/(Cst+Coled+Cboost)]. By appropriately sizing capacitor Cboost, the attenuation of the drive current caused by Coled can be decreased for certain data voltage ranges. Thus, capacitor Cboost serves to boost the drive current levels and is therefore sometimes referred to as a current boosting capacitor.

Figure 8A:
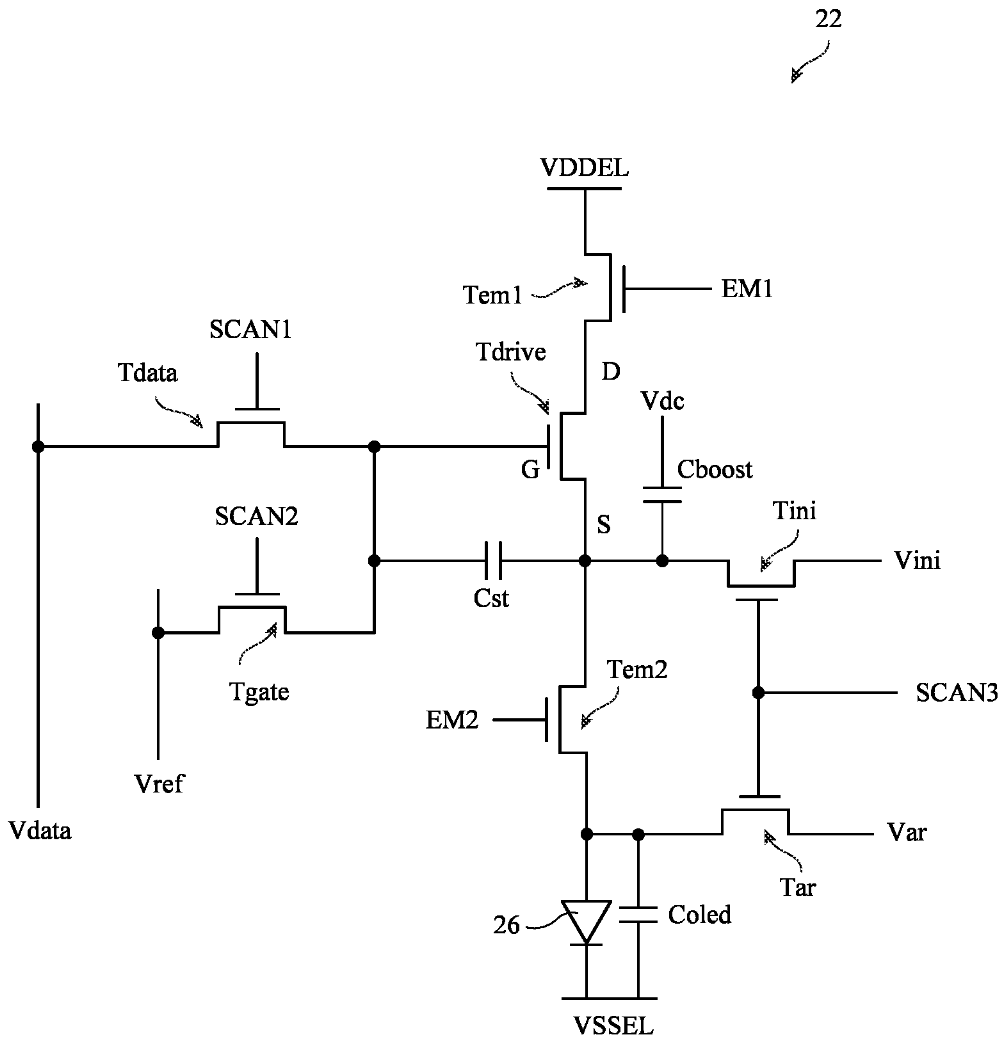
FIG. 8A is a circuit diagram of an illustrative display pixel having a drive transistor source node that is decoupled from an OLED anode during the threshold voltage sampling phase in accordance with some embodiments.

The embodiment of FIG. 7 in which emission transistors Tem1 and Tem2 are controlled by a common emission signal EM is merely illustrative. FIG. 8A shows another embodiment of pixel 22 having emission transistors controlled by separate emission control signals. As shown in FIG. 8A, emission transistor Tem1 has a gate configured to receive a first emission control signal EM1, whereas emission transistor Tem2 has a gate configured to receive a second emission control signal EM2. Having a separate emission control signal EM2 allows transistor Tem2 to be turned off during the Vt sampling phase, which electrically isolates the drive transistor source terminal from the anode terminal. Separating or decoupling the drive transistor source terminal from the anode terminal improves the immunity of pixel 22 to potential noise sources that can sometimes be coupled onto the VSSEL common electrode. For example, a touch sensor array that is sometimes overlaid on top of display 14 can inject noise onto the VSSEL line. By turning off transistor Tem2 during the Vt sampling and data programming phase, such types of noise injection can be rejected.

Capacitor Cst has a first terminal coupled to the gate terminal of transistor Tdrive and has a second terminal coupled to the source terminal of transistor Tdrive. Capacitor Cboost has a first terminal coupled to the source terminal of transistor Tdrive and a second terminal coupled to voltage Vdc. Voltage Vdc can be shorted to VDDEL, VSSEL, Vref, Var, Vini, or other available/existing voltage within pixel 22. The structure and function of the remainder of pixel 22 of FIG. 8A is identical to that of FIG. 5A and need not be reiterated for the sake of clarity. Configured in this way, the drive current of pixel 22 of FIG. 8A will be proportional to [(Cboost)/(Cst+Cboost)]. By appropriately sizing capacitor Cboost, the drive current can be kept relatively sign for certain data voltage ranges during the data programming phase. Thus, capacitor Cboost serves to boost the drive current levels and is therefore sometimes referred to as a current boosting capacitor.

Figure 8B:
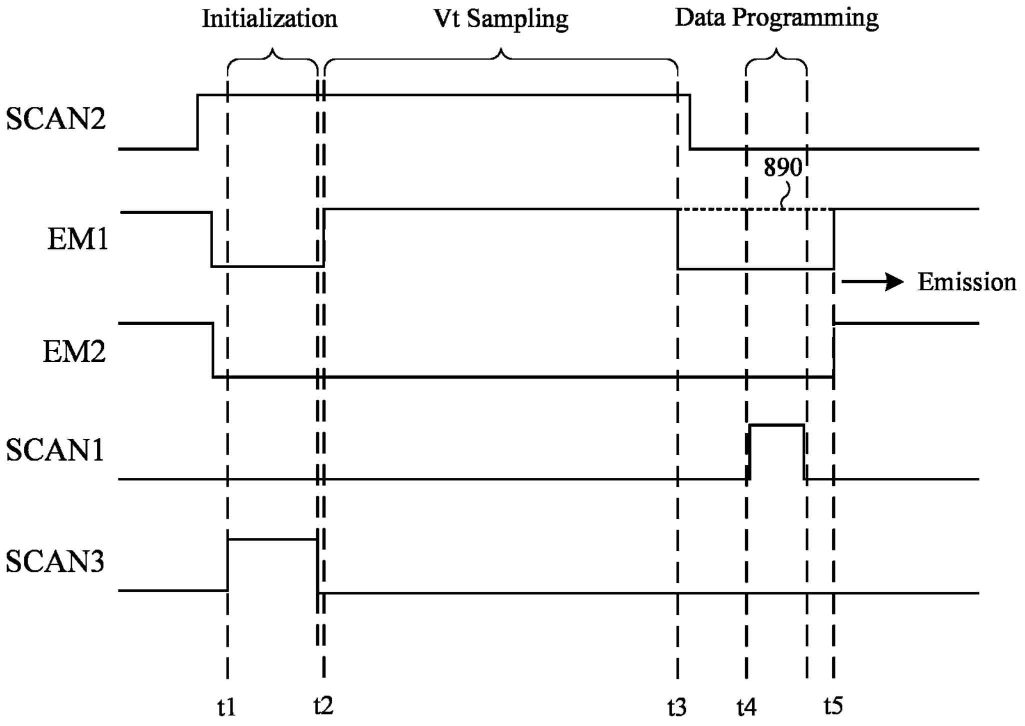
FIG. 8B is a timing diagram illustrating the behavior of relevant control waveforms during a refresh operation of the pixel shown in FIG. 8A in accordance with some embodiments.

FIG. 8B is a timing diagram illustrating the operation of display pixel 22 of the type shown in FIG. 8A. Prior to time t1, scan signal SCAN2 can be asserted (e.g., driven high) to activate (turn on) transistor Tgate, and emission signals EM1 and EM2 can be deasserted (e.g., driven low) to turn off transistors Tem1 and Tem2. Activating transistor Tgate drives the gate terminal of transistor Tdrive to the reference voltage level Vref. At time t1, scan signal SCAN3 is temporarily pulsed high to turn on transistors Tini and Tar. Activating transistor Tini drives the source node of transistor Tdrive to voltage Vini, whereas activating transistor Tar drives the OLED anode terminal to voltage Var. During the initialization phase, the gate-to-source voltage Vgs of transistor Tdrive will therefore be biased to (Vref−Vini).

At time t2, only emission signal EM1 is asserted (e.g., driven high) to turn on transistor Tem1 while transistor Tem2 remains off. Turning on transistor Tem1 drives the drain terminal of transistor Tdrive up to VDDEL, which will result in the source terminal of transistor Tdrive to charge up to one Vt below the Vref level at the gate of transistor Tdrive. In other words, the source terminal of transistor Tdrive will charge up to (Vref−Vt) during the Vt sampling phase from time t2 to t3. Since transistor Tem2 is turned off during this time, any potential noise injected onto VSSEL and the OLED anode terminal will be isolated from the drive transistor source terminal.

At time t4, scan signal SCAN1 is pulsed high to turn on transistor Tdata. Activating transistor Tdata drives the gate terminal of transistor Tdrive to data voltage Vdata corresponding to a new data signal value for pixel 22. Since transistors Tem2 and Tar are both turned off at this time, the anode terminal is a high impedance node so capacitor Cst cannot discharge (e.g., the voltage across capacitor Cst will remain equal to Vt even though the drive transistor gate terminal will be driven to a new Vdata level). This time period during which transistor Tdata is activated to load in data voltage Vdata is referred to as the data programming phase. If desired, emission signal EM1 can optionally be asserted through the data programming phase to allow a current that is proportional to Vdata to flow through at least emission transistor Tem1 during the period from t3 to t5 (see alternate waveform 890).

At time t5, emission signal EM is asserted to begin the emission phase during which diode 26 can emit an amount of light that is proportional to voltage Vdata. During the emission phase, the resulting Vgs of transistor Tdrive will be equal to [Vdata−(Vref−Vt)]. Since the final emission current is proportional to Vgs minus Vt, the emission current will be independent of Vt since (Vgs−Vt) will be equal to (Vdata−Vref+Vt−Vt), where Vt cancels out to complete the in-pixel threshold voltage canceling operation. As described above in connection with FIG. 5B, the duration of the Vt sampling phase can be independently increased relative to the duration of the data programming phase to minimize the temperature luminance sensitivity of display 14 (e.g., the duration of the Vt sampling phase can be at least 2 times, 5 times, 2-5 times, 10 times, 5-10 times, 10-20 times, or more than 20 times longer than the duration of the data programming phase).

Figure 8C:
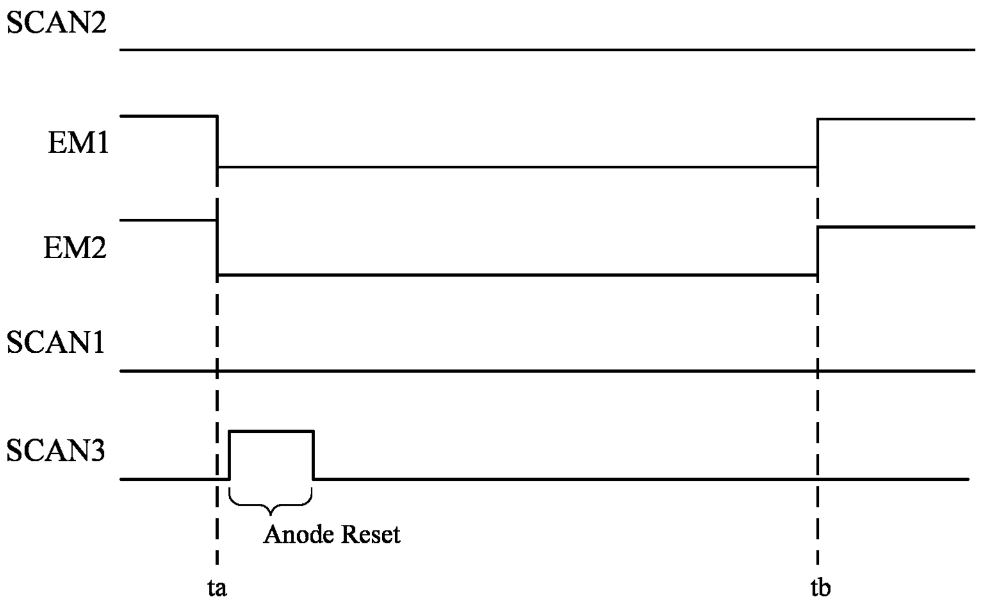
FIG. 8C is a timing diagram illustrating the behavior of relevant control waveforms during a vertical blanking operation of the pixel shown in FIG. 8A in accordance with some embodiments.

Pixel 22 of FIG. 8A can be used in a low refresh rate display. FIG. 8C is a timing diagram illustrating the behavior of relevant signal waveforms to control pixel 22 of FIG. 8A during an extended vertical blanking period of a low refresh rate operation. Prior to time ta, emission signals EM1 and EM2 may be deasserted (e.g., driven low) to temporarily halt emission. After time ta, signal SCAN3 can be pulsed to temporarily activate transistors Tar and Tini. Activating transistor Tar will drive the OLED anode terminal to the anode reset voltage level Var. At time tb, emission signals EM1 and EM2 may be asserted to resume emission. The duration from time ta to tb should be equal to the active refresh period from time t1 to t5 (see FIG. 8B). Such anode reset can be performed every 8 ms, every 4 ms, every 2 ms, or at other suitable intervals during the vertical blanking period depending on when the system can update data values. Performing multiple anode resets during the vertical blanking period can help mitigate low grey level flicker and luminance variation when display 14 is operating at low refresh rates.

The embodiment of pixel 22 in FIG. 8A in which emission transistor Tem1 is interposed between the positive power supply line and transistor Tdrive is merely illustrative. In such an arrangement, a parasitic gate-to-drain capacitance across transistor Tdrive can cause a data signal associated with a previous row to be inadvertently coupled to the drain terminal of transistor Tdrive, which is typically floating during the data programming phase. Due to this potential data coupling to the drive transistor drain terminal, the SCAN1 data loading pulse has to be limited to less than one row time. Such tight constraint on the SCAN1 pulse time can increase the design complexity of gate driver circuitry 34 (FIG. 2).

Figure 9:
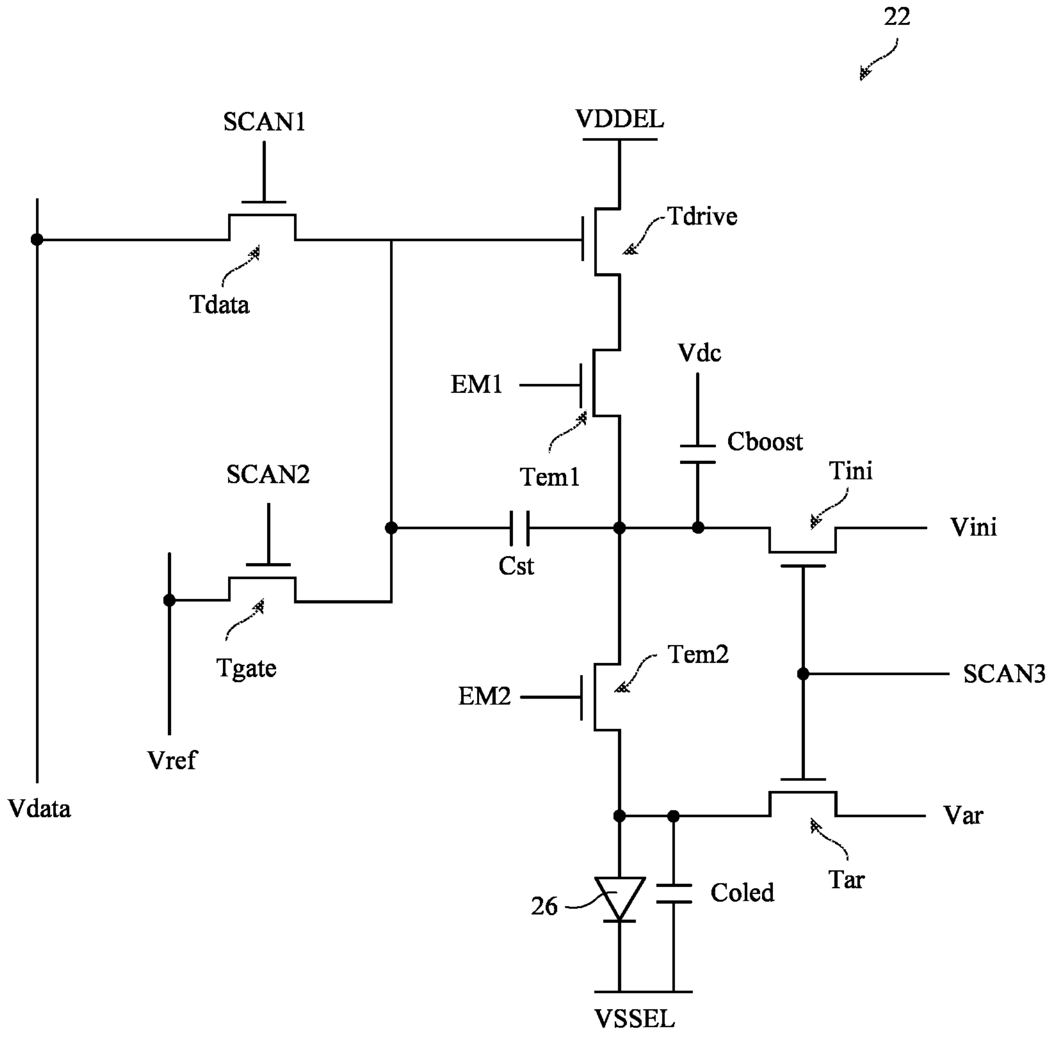
FIG. 9 is a circuit diagram of an illustrative display pixel having a drive transistor drain node shorted to a positive power supply in accordance with some embodiments.

To help alleviate such design constraint, the order of transistors Tem1 and Tdrive can be swapped (see, e.g., FIG. 9). As shown in FIG. 9, emission transistor Tem1 may be interposed between transistor Tdrive and Tem2. In particular, transistor Tdrive may have a drain terminal shorted to VDDEL and a source terminal coupled to emission transistor Tem1. By connecting the drain terminal of transistor Tdrive to VDDEL, the drive transistor drain terminal is no longer floating so there can be no potential memory of the previous row data stored at that node. As a result, the SCAN1 pulse width during the data programming phase can be more than one row time. Allowing for a wider SCAN1 pulse can help simplify the gate driver design.

Capacitor Cst has a first terminal coupled to the gate terminal of transistor Tdrive and has a second terminal coupled to the source terminal of transistor Tem1. Capacitor Cboost has a first terminal coupled to the source terminal of transistor Tem1 and a second terminal coupled to voltage Vdc. Voltage Vdc can be shorted to VDDEL, VSSEL, Vref, Var, Vini, or other available/existing voltage within pixel 22. Because the location of transistors Tdrive and Tem1 are now swapped, transistors Tem2 and Tini are now directly coupled to the source terminal of transistor Tem1.

The structure and function of the remainder of pixel 22 of FIG. 9 is similar to that of FIG. 8A and need not be reiterated for the sake of clarity. The data refresh operation of FIG. 8B and the vertical blanking anode reset operation of FIG. 8C can also be applied to pixel 22 of FIG. 9. Configured and operated in this way, the drive current of pixel 22 of FIG. 9 will be proportional to [(Cboost)/(Cst+Cboost)]. By appropriately sizing capacitor Cboost, the drive current can be kept relatively sign for certain data voltage ranges during the data programming phase. Thus, capacitor Cboost serves to boost the drive current levels and is therefore sometimes referred to as a current boosting capacitor.

Figure 10:
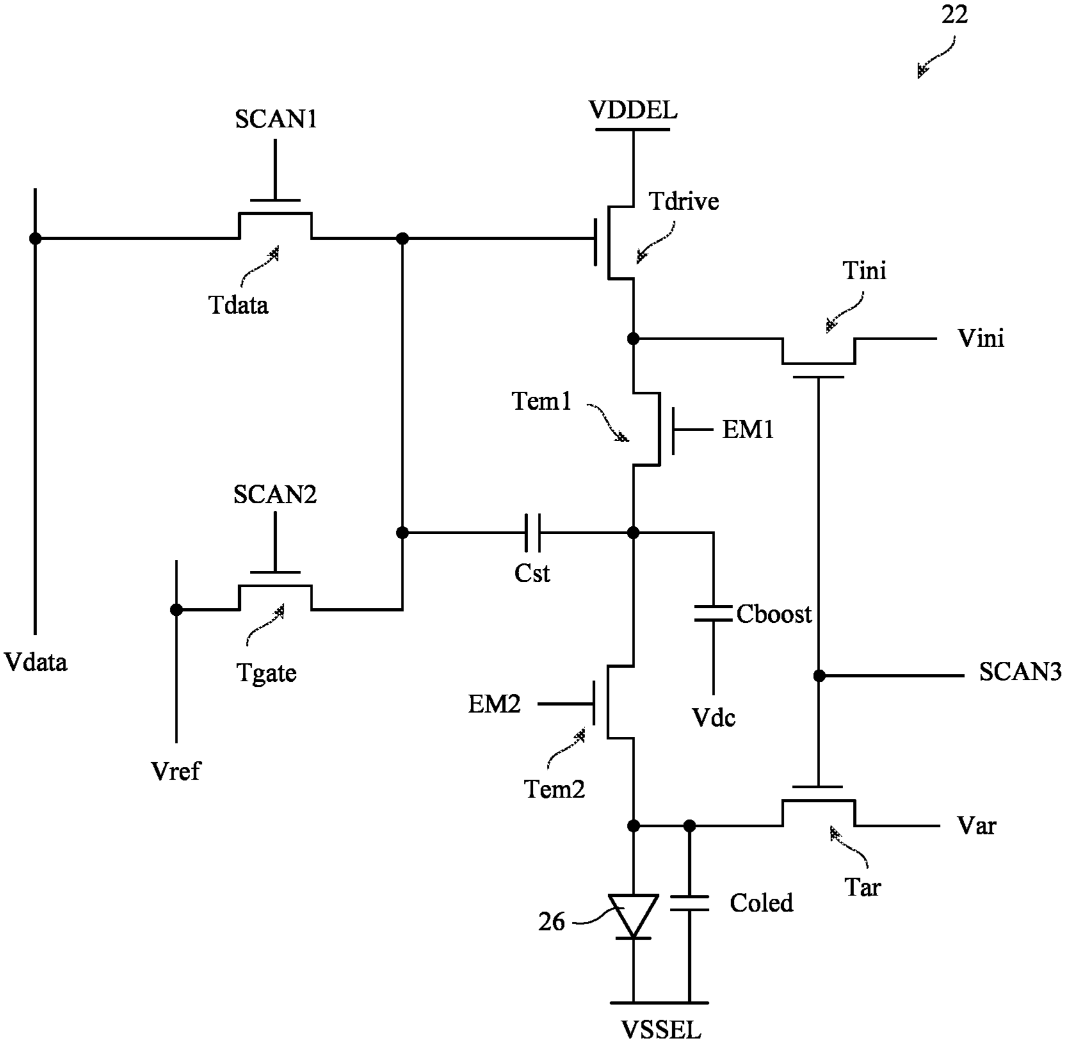
FIG. 10 is a circuit diagram of an illustrative display pixel having a drive transistor drain node shorted to a positive power supply and having a drive transistor source node driven to an initialization voltage level during an initialization phase in accordance with some embodiments.

In the embodiment of FIG. 9, transistor Tini cannot apply voltage Vini to transistor Tdrive during the initialization phase since transistor Tem1 is turned off during the initialization phase. In other words, the on-bias stress operation cannot be applied to pixel 22 of FIG. 9. FIG. 10 shows another embodiment of pixel 22 where initialization transistor Tini is coupled to the source terminal of transistor Tdrive. Connecting transistor Tini directly to the source terminal of transistor Tdrive enables transistor Tini to perform an on-bias stress operation during the initialization phase to mitigate hysteresis and first frame dimming. The structure and function of the remainder of pixel 22 of FIG. 10 is identical to that of FIG. 9 and need not be reiterated for the sake of clarity. The data refresh operation of FIG. 8B can also be applied to pixel 22 of FIG. 10. During the initialization phase, however, signal EM1 can remain asserted (e.g., kept high) to turn on transistor Tem1. Similarly, the vertical blanking anode reset control scheme of FIG. 8C can also be applied to pixel 22 of FIG. 10.

Figure 11A:
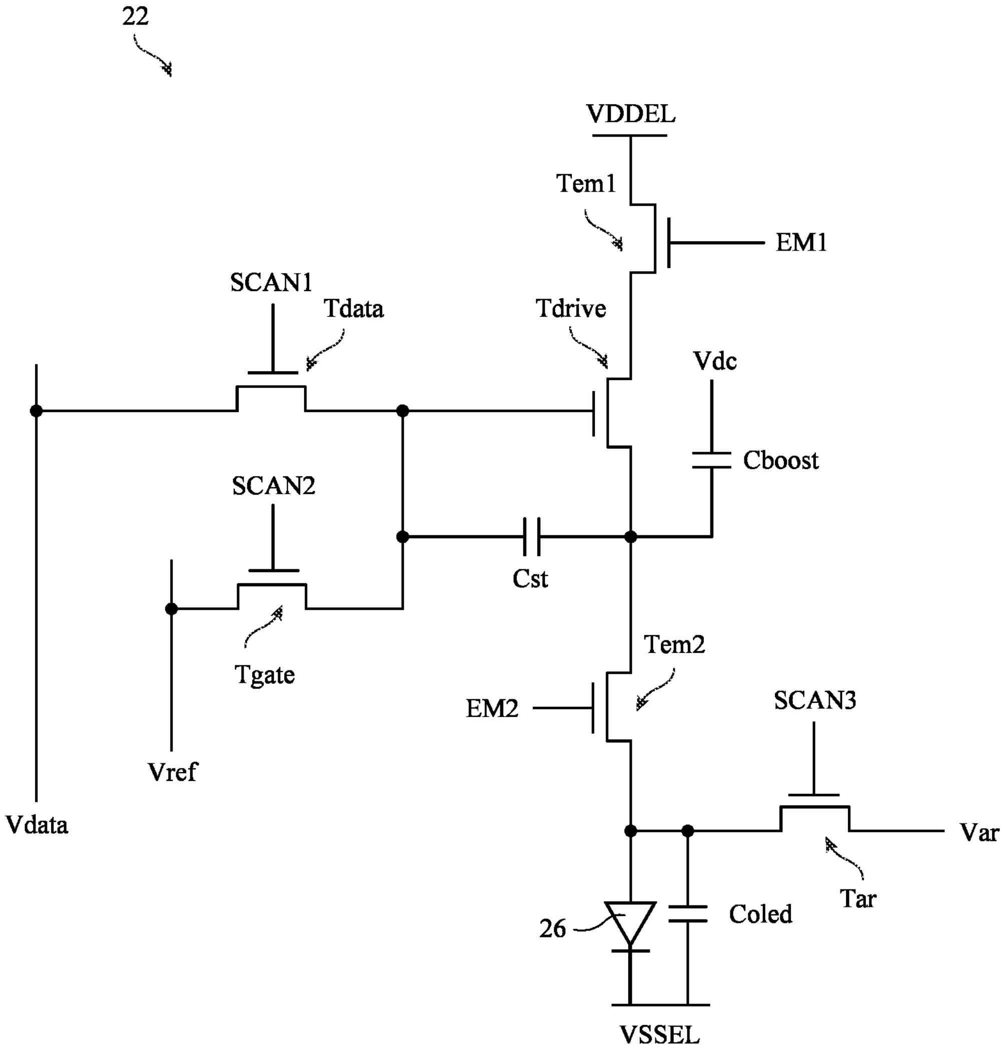
FIG. 11A is a circuit diagram of an illustrative display pixel having an anode reset transistor but lacks a separate initialization transistor in accordance with some embodiments.

The embodiment of FIG. 8A where pixel 22 includes both an anode reset transistor Tar coupled to the anode terminal and a separate initialization transistor Tini coupled to transistor Tdrive is merely illustrative. FIG. 11A shows another suitable embodiment of pixel 22 that does not include the separate initialization transistor Tini. In other words, the structure and function of pixel 22 of FIG. 11A is identical to that of FIG. 8A, except pixel 22 of FIG. 11A includes one less transistor (i.e., pixel 22 of FIG. 11A does not include transistor Tini).

Figure 11B:
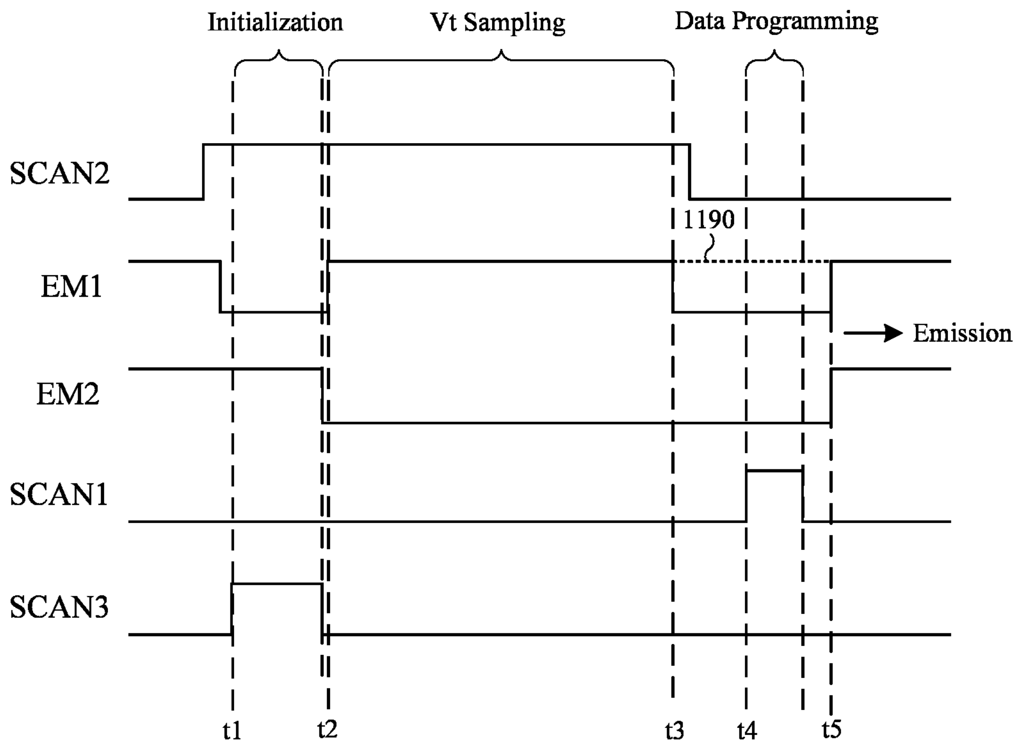
FIG. 11B is a timing diagram illustrating the behavior of relevant control waveforms during a refresh operation of the pixel shown in FIG. 11A in accordance with some embodiments.

FIG. 11B is a timing diagram illustrating the operation of display pixel 22 of the type shown in FIG. 11A. Prior to time t1, scan signal SCAN2 can be asserted (e.g., driven high) to activate (turn on) transistor Tgate, and emission signal EM1 can be deasserted (e.g., driven low) to turn off transistor Tem1. Activating transistor Tgate drives the gate terminal of transistor Tdrive to the reference voltage level Vref. At time t1, scan signal SCAN3 is temporarily pulsed high to turn on transistor Tar. Activating transistor Tar drives the OLED anode terminal to voltage Var. Because signal EM2 remains high during the initialization phase, the source terminal of transistor Tdrive is also reset to Var via transistor Tem2. During the initialization phase, the gate-to-source voltage Vgs of transistor Tdrive will therefore be biased to (Vref−Var). Since voltage Var is also applied directly to the source terminal of transistor Tdrive during the initialization phase, voltage Var can also serve to apply an on-bias stress to mitigate Vt hysteresis and improve first frame response.

At time t2, only emission signal EM1 is asserted (e.g., driven high) to turn on transistor Tem1 while transistor Tem2 is off Turning on transistor Tem1 drives the drain terminal of transistor Tdrive up to VDDEL, which will result in the source terminal of transistor Tdrive to charge up to one Vt below the Vref level at the gate of transistor Tdrive. In other words, the source terminal of transistor Tdrive will charge up to (Vref−Vt) during the Vt sampling phase from time t2 to t3. Since transistor Tem2 is turned off during this time, any potential noise injected onto VSSEL and the OLED anode terminal will be isolated from the drive transistor source terminal.

At time t4, scan signal SCAN1 is pulsed high to turn on transistor Tdata during the data programming phase. Activating transistor Tdata drives the gate terminal of transistor Tdrive to data voltage Vdata corresponding to a new data signal value for pixel 22. Since transistors Tem2 and Tar are both turned off at this time, the anode terminal is a high impedance node so capacitor Cst cannot discharge (e.g., the voltage across capacitor Cst will remain equal to Vt even though the drive transistor gate terminal will be driven to a new Vdata level). If desired, emission signal EM1 can optionally be asserted through the data programming phase to allow a current that is proportional to Vdata to flow through at least emission transistor Tem1 during the period from t3 to t5 (see alternate waveform 1190).

At time t5, emission signal EM is asserted to begin the emission phase during which diode 26 can emit an amount of light that is proportional to voltage Vdata. During the emission phase, the resulting Vgs of transistor Tdrive will be equal to [Vdata−(Vref−Vt)]. Since the final emission current is proportional to Vgs minus Vt, the emission current will be independent of Vt since (Vgs−Vt) will be equal to (Vdata−Vref+Vt−Vt), where Vt cancels out to complete the in-pixel threshold voltage canceling operation. As described above in connection with FIG. 5B, the duration of the Vt sampling phase can be independently increased relative to the duration of the data programming phase to minimize the temperature luminance sensitivity of display 14 (e.g., the duration of the Vt sampling phase can be at least 2 times, 5 times, 2-5 times, 10 times, 5-10 times, 10-20 times, or more than 20 times longer than the duration of the data programming phase).

Figure 11C:
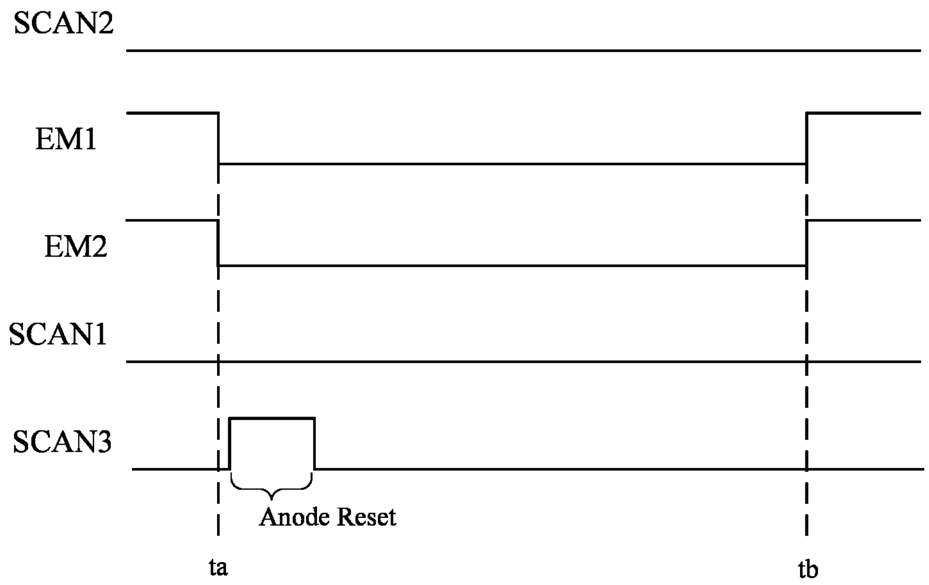
FIG. 11C is a timing diagram illustrating the behavior of relevant control waveforms during a vertical blanking operation of the pixel shown in FIG. 11A in accordance with some embodiments.

Pixel 22 of FIG. 11A can be used in a low refresh rate display. FIG. 11C is a timing diagram illustrating the behavior of relevant signal waveforms to control pixel 22 of FIG. 11A during an extended vertical blanking period of a low refresh rate operation. Prior to time ta, emission signals EM1 and EM2 may be deasserted (e.g., driven low) to temporarily halt emission. After time ta, signal SCAN3 can be pulsed to temporarily activate transistor Tar. Activating transistor Tar will drive the OLED anode terminal to the anode reset voltage level Var. At time tb, emission signals EM1 and EM2 may be asserted to resume emission. The duration from time ta to tb should be equal to the active refresh period from time t1 to t5 (see FIG. 11B). Such anode reset can be performed every 8 ms, every 4 ms, every 2 ms, or at other suitable intervals during the vertical blanking period depending on when the system can update data values. Performing multiple anode resets during the vertical blanking period can help mitigate low grey level flicker and luminance variation when display 14 is operating at low refresh rates.

Figure 12A:
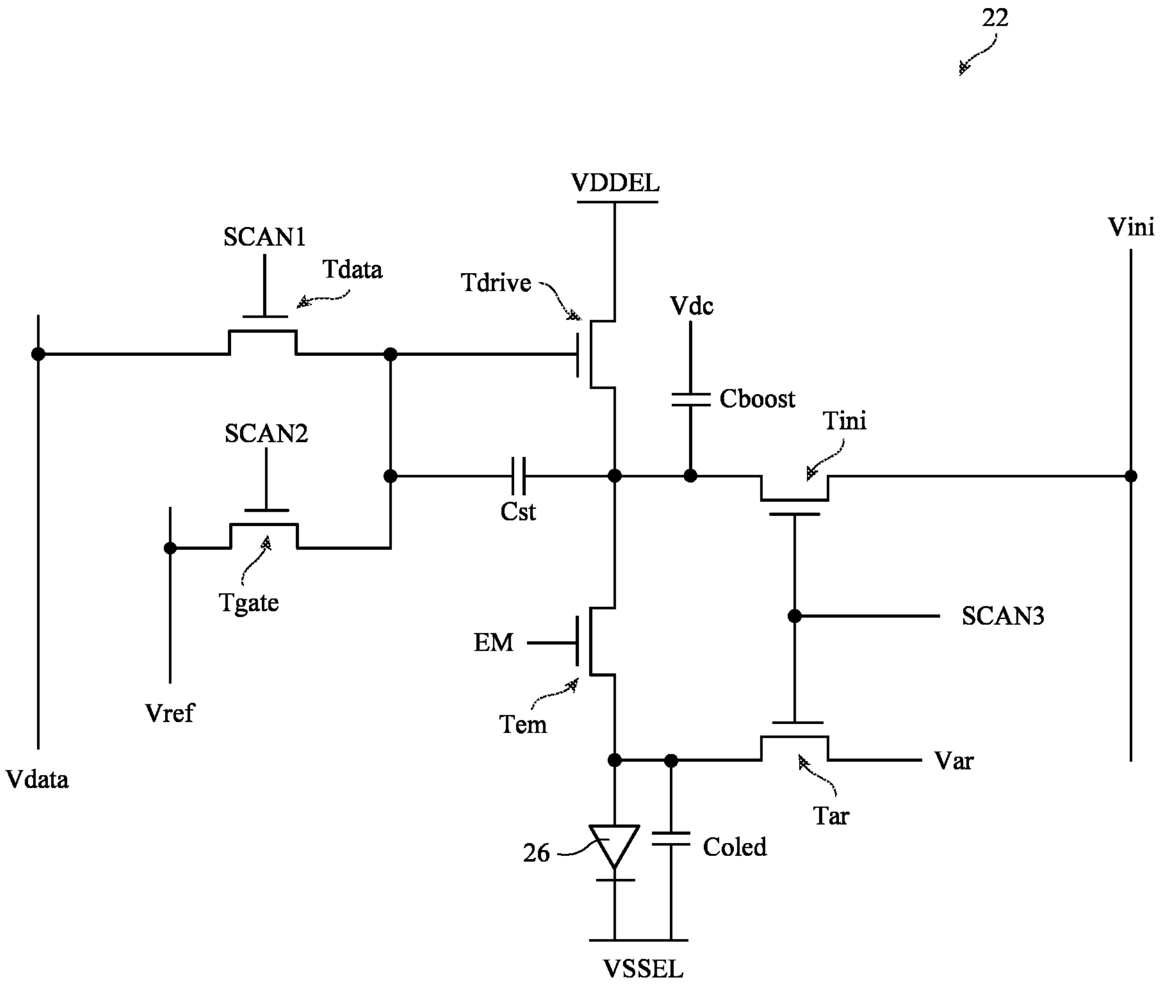
FIG. 12A is a circuit diagram of an illustrative display pixel having a reduced number of emission transistors in accordance with some embodiments.

The embodiment of FIG. 8A in which pixel 22 includes two emission transistors is merely illustrative. FIG. 12A shows another suitable embodiment of pixel 22 that includes one emission transistor. In other words, the structure and function of pixel 22 of FIG. 12A is identical to that of FIG. 8A, except pixel 22 of FIG. 12A includes one less emission transistor (i.e., pixel 22 of FIG. 12A includes a single emission transistor Tem coupled between transistor Tdrive and diode 26 but does not include any other emission control transistor). The single emission transistor Tem has a gate configured to receive emission signal EM.

Figure 12B:
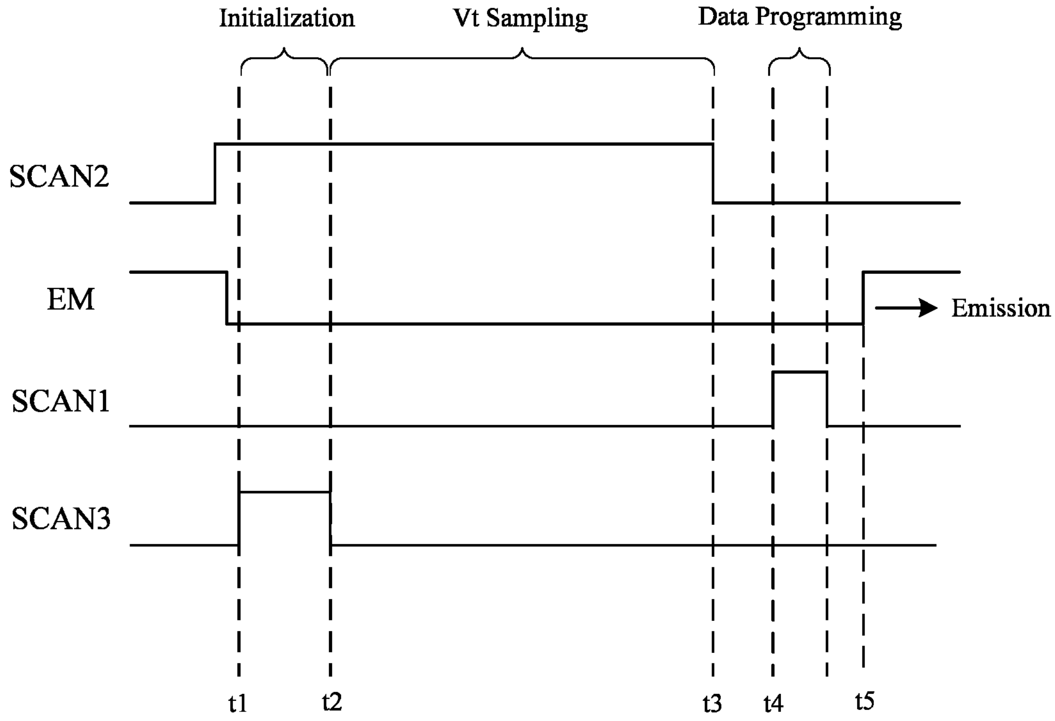
FIG. 12B is a timing diagram illustrating the behavior of relevant control waveforms during a refresh operation of the pixel shown in FIG. 12A in accordance with some embodiments.

FIG. 12B is a timing diagram illustrating the operation of display pixel 22 of the type shown in FIG. 12A. Prior to time t1, scan signal SCAN2 can be asserted (e.g., driven high) to activate (turn on) transistor Tgate, and emission signal EM can be deasserted (e.g., driven low) to turn off transistor Tem. Activating transistor Tgate drives the gate terminal of transistor Tdrive to the reference voltage level Vref. At time t1, scan signal SCAN3 is temporarily pulsed high to turn on transistors Tar and Tini. Activating transistor Tini drives the source terminal of transistor Tdrive to Vini, whereas activating transistor Tar drives the OLED anode terminal to voltage Var. During the initialization phase, the gate-to-source voltage Vgs of transistor Tdrive will therefore be biased to (Vref−Vini).

During this time, there can be a short current path from VDDEL to Vini through transistors Tdrive and Tini. If Vini were to be conveyed on a row-wise routing line, such current from every single accessed pixel along a given row would produce a large IR drop. To help keep the IR drop to manageable levels, initialization voltage Vini may be routed to pixel 22 via a column-wise routing line so that only each initialization column line will only see one short current path when any given row is being accessed.

From time t2 to t3, only SCAN2 remains asserted. Since the drain terminal of transistor Tdrive is now directly connected to VDDEL, turning off SCAN3 at time t2 will allow the source terminal of transistor Tdrive to charge up to one Vt below the Vref level at the gate of transistor Tdrive. In other words, the source terminal of transistor Tdrive will charge up to (Vref−Vt) during the Vt sampling phase from time t2 to t3.

At time t4, scan signal SCAN1 is pulsed high to turn on transistor Tdata during the data programming phase. Activating transistor Tdata drives the gate terminal of transistor Tdrive to data voltage Vdata corresponding to a new data signal value for pixel 22. Since transistors Tem and Tini are both turned off at this time, capacitor Cst cannot discharge (e.g., the voltage across capacitor Cst will remain equal to Vt even though the drive transistor gate terminal will be driven to a new Vdata level). If desired, emission signal EM can optionally be asserted through the data programming phase to allow a current that is proportional to Vdata to flow through emission transistor Tem during the period from t3 to t5 (see alternate waveform 1490).

At time t5, emission signal EM is asserted to begin the emission phase during which diode 26 can emit an amount of light that is proportional to voltage Vdata. During the emission phase, the resulting Vgs of transistor Tdrive will be equal to [Vdata−(Vref−Vt)]. Since the final emission current is proportional to Vgs minus Vt, the emission current will be independent of Vt since (Vgs−Vt) will be equal to (Vdata−Vref+Vt−Vt), where Vt cancels out to complete the in-pixel threshold voltage canceling operation. As described above in connection with FIG. 5B, the duration of the Vt sampling phase can be independently increased relative to the duration of the data programming phase to minimize the temperature luminance sensitivity of display 14 (e.g., the duration of the Vt sampling phase can be at least 2 times, 5 times, 2-5 times, 10 times, 5-10 times, 10-20 times, or more than 20 times longer than the duration of the data programming phase).

Figure 12C:
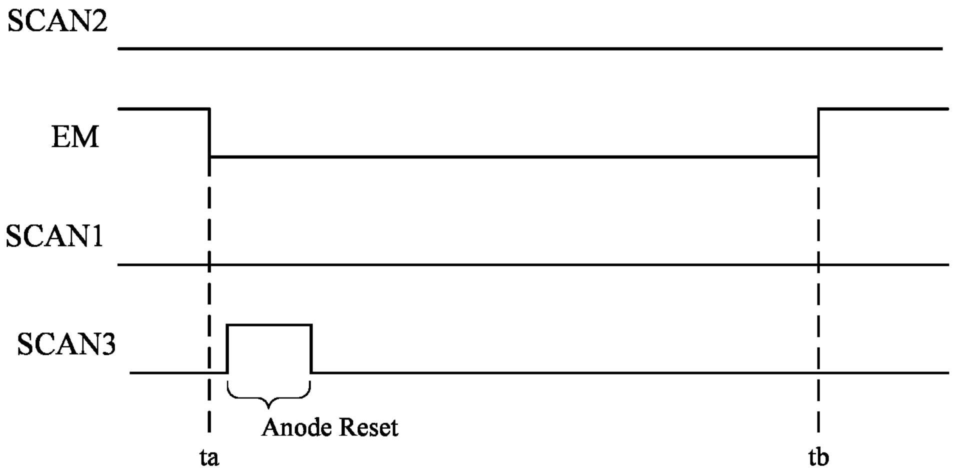
FIG. 12C is a timing diagram illustrating the behavior of relevant control waveforms during a vertical blanking operation of the pixel shown in FIG. 12A in accordance with some embodiments.

Pixel 22 of FIG. 12A can be used in a low refresh rate display. FIG. 12C is a timing diagram illustrating the behavior of relevant signal waveforms to control pixel 22 of FIG. 12A during an extended vertical blanking period of a low refresh rate operation. Prior to time ta, emission signal EM may be deasserted (e.g., driven low) to temporarily halt emission. After time ta, signal SCAN3 can be pulsed to temporarily activate transistors Tar and Tini. Activating transistor Tar will drive the OLED anode terminal to the anode reset voltage level Var. At time tb, emission signal EM may be asserted to resume emission. The duration from time ta to tb should be equal to the active refresh period from time t1 to t5 (see FIG. 12B). Such anode reset can be performed every 8 ms, every 4 ms, every 2 ms, or at other suitable intervals during the vertical blanking period depending on when the system can update data values. Performing multiple anode resets during the vertical blanking period can help mitigate low grey level flicker and luminance variation when display 14 is operating at low refresh rates.

Figure 13A:
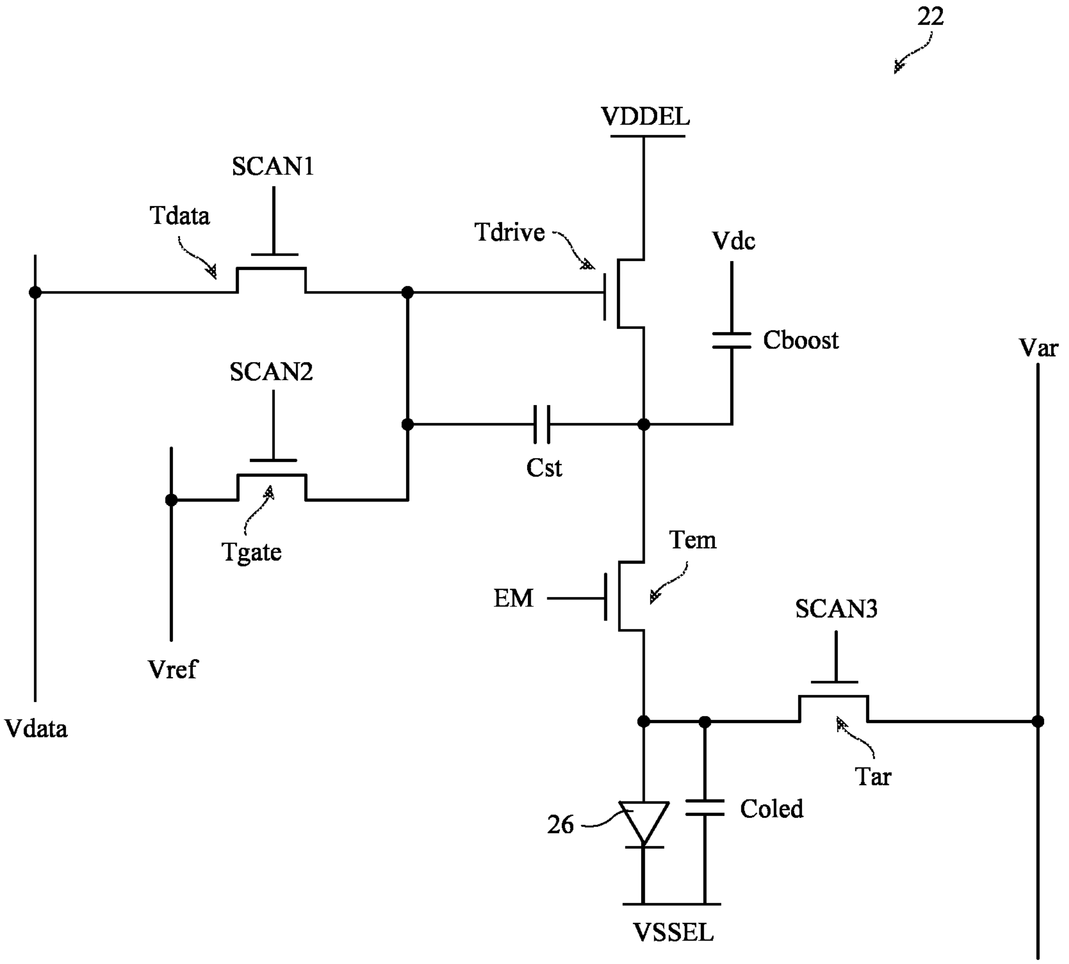
FIG. 13A is a circuit diagram of an illustrative display pixel having only five transistors and two capacitors in accordance with some embodiments.

The embodiment of FIG. 12A where pixel 22 includes both an anode reset transistor Tar coupled to the anode terminal and a separate initialization transistor Tini coupled to transistor Tdrive is merely illustrative. FIG. 13A shows another suitable embodiment of pixel 22 that does not include the separate initialization transistor Tini. In other words, the structure and function of pixel 22 of FIG. 13A is identical to that of FIG. 12A, except pixel 22 of FIG. 13A includes one less transistor (i.e., pixel 22 of FIG. 13A does not include transistor Tini). Thus, pixel 22 of FIG. 13A includes only five semiconducting oxide transistors and two capacitors Cst and Cboost.

Figure 13B:
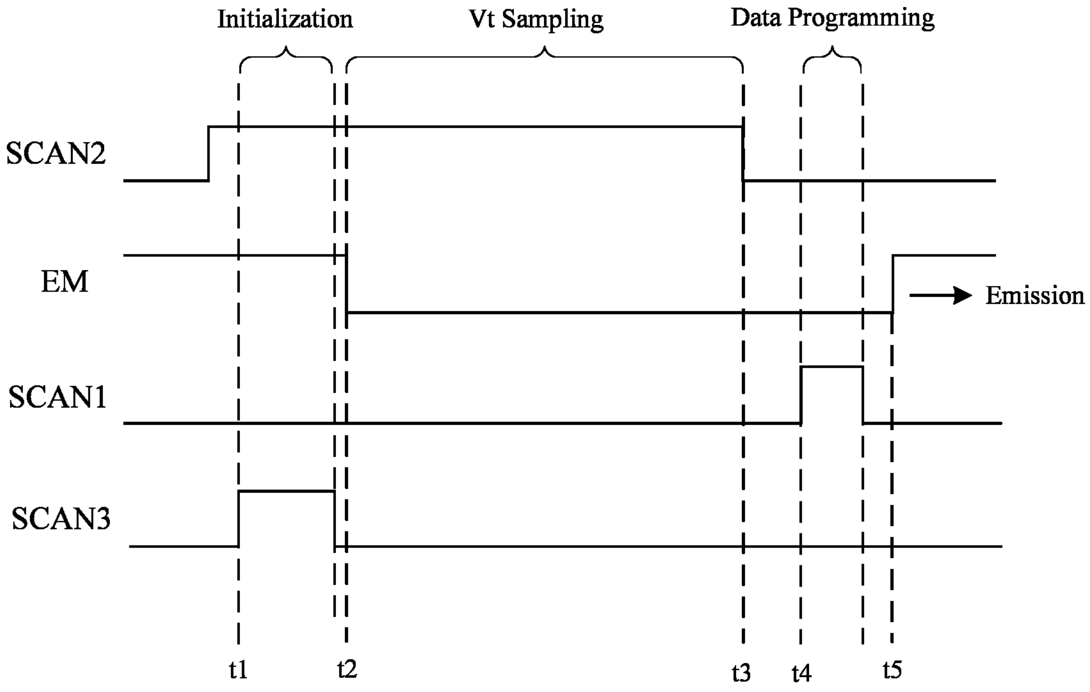
FIG. 13B is a timing diagram illustrating the behavior of relevant control waveforms during a refresh operation of the pixel shown in FIG. 13A in accordance with some embodiments.

FIG. 13B is a timing diagram illustrating the operation of display pixel 22 of the type shown in FIG. 13A. Prior to time t1, scan signal SCAN2 can be asserted (e.g., driven high) to activate (turn on) transistor Tgate. Activating transistor Tgate drives the gate terminal of transistor Tdrive to the reference voltage level Vref. At time t1, scan signal SCAN3 is temporarily pulsed high to turn on transistor Tar. Activating transistor Tar drives the source terminal of transistor Tdrive to Var. Since signal EM is kept high during the initialization phase, voltage Var can be applied to the source terminal of transistor Tdrive via transistor Tem. During the initialization phase, the gate-to-source voltage Vgs of transistor Tdrive will therefore be biased to (Vref−Var). Since voltage Var is also applied directly to the source terminal of transistor Tdrive during the initialization phase, voltage Var can also serve to apply an on-bias stress to mitigate Vt hysteresis and improve first frame response.

During this time, there can be a short current path from VDDEL to Var through transistors Tdrive, Tem, and Tar. If Var were to be conveyed on a row-wise routing line, such current from every single accessed pixel along a given row would produce a large IR drop. To help keep the IR drop to manageable levels, anode reset voltage Var may be routed to pixel 22 via a column-wise routing line so that only each anode reset column line will only see one short current path when any given row is being accessed.

From time t2 to t3, only SCAN2 remains asserted. Since the drain terminal of transistor Tdrive is now directly connected to VDDEL, turning off SCAN3 at time t2 will allow the source terminal of transistor Tdrive to charge up to one Vt below the Vref level at the gate of transistor Tdrive. In other words, the source terminal of transistor Tdrive will charge up to (Vref−Vt) during the Vt sampling phase from time t2 to t3.

At time t4, scan signal SCAN1 is pulsed high to turn on transistor Tdata during the data programming phase. Activating transistor Tdata drives the gate terminal of transistor Tdrive to data voltage Vdata corresponding to a new data signal value for pixel 22. Since transistor Tem is turned off at this time, capacitor Cst cannot discharge (e.g., the voltage across capacitor Cst will remain equal to Vt even though the drive transistor gate terminal will be driven to a new Vdata level).

At time t5, emission signal EM is asserted to begin the emission phase during which diode 26 can emit an amount of light that is proportional to voltage Vdata. During the emission phase, the resulting Vgs of transistor Tdrive will be equal to [Vdata−(Vref−Vt)]. Since the final emission current is proportional to Vgs minus Vt, the emission current will be independent of Vt since (Vgs−Vt) will be equal to (Vdata−Vref+Vt−Vt), where Vt cancels out to complete the in-pixel threshold voltage canceling operation. As described above in connection with FIG. 5B, the duration of the Vt sampling phase can be independently increased relative to the duration of the data programming phase to minimize the temperature luminance sensitivity of display 14 (e.g., the duration of the Vt sampling phase can be at least 2 times, 5 times, 2-5 times, 10 times, 5-10 times, 10-20 times, or more than 20 times longer than the duration of the data programming phase).

Pixel 22 of FIG. 13A can also be used in a low refresh rate display. The vertical blanking anode reset control scheme of FIG. 12C can also be applied to pixel 22 of FIG. 13A.

Figure 14A:
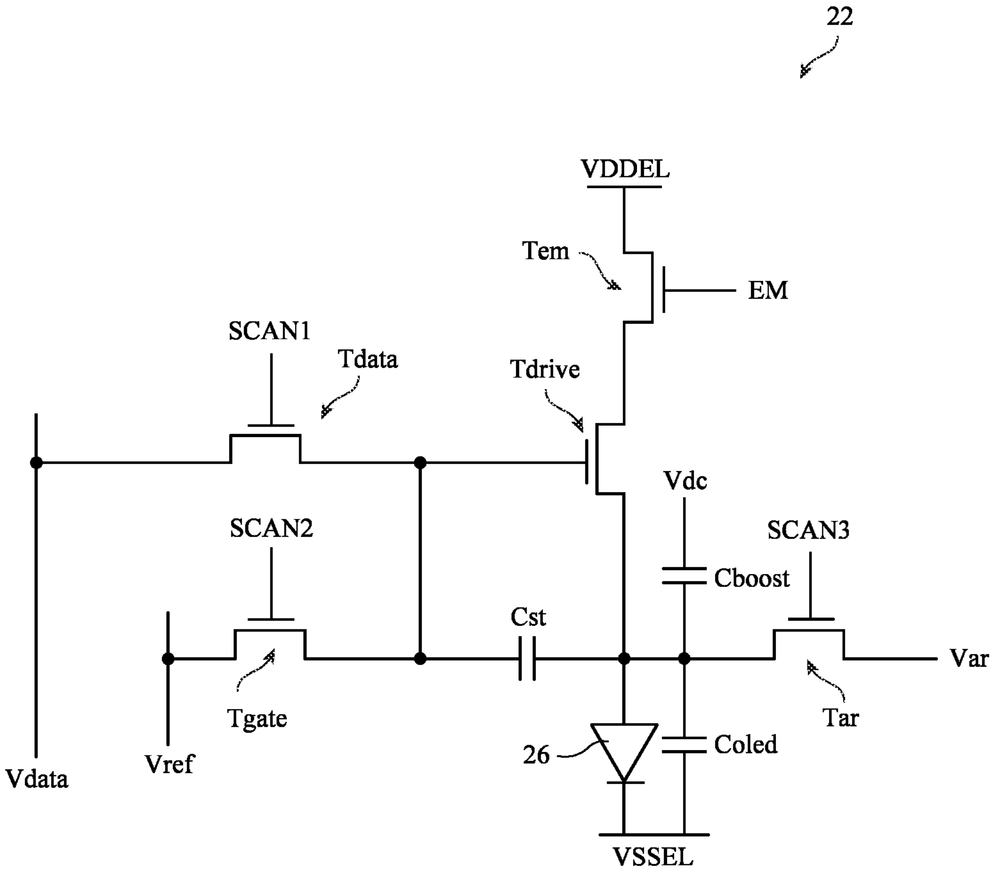
FIG. 14A is a circuit diagram of an illustrative display pixel having only five transistors and two capacitors in accordance with some embodiments.

The embodiment of FIG. 13A where pixel 22 includes transistor Tdrive having a drain terminal shorted to the VDDEL power supply line is merely illustrative. FIG. 14A shows another suitable embodiment of pixel 22 having transistor Tdrive with a drain terminal coupled to the VDDEL line via emission transistor Tem and a source terminal coupled to the anode terminal. In other words, the structure and function of pixel 22 of FIG. 14A is identical to that of FIG. 13A, except the position of transistors Tdrive and Tem are swapped. Pixel 22 of FIG. 14A includes only five semiconducting oxide transistors and two capacitors Cst and Cboost. In particular, capacitor Cst has a first terminal coupled to the gate terminal of transistor Tdrive and has a second terminal coupled to the anode terminal. Capacitor Cboost has a first terminal coupled to the anode terminal and a second terminal configured to receive voltage Vdc. Pixel 22 need not include capacitor Cboost (i.e., capacitor Cboost is optional).

Figure 14B:
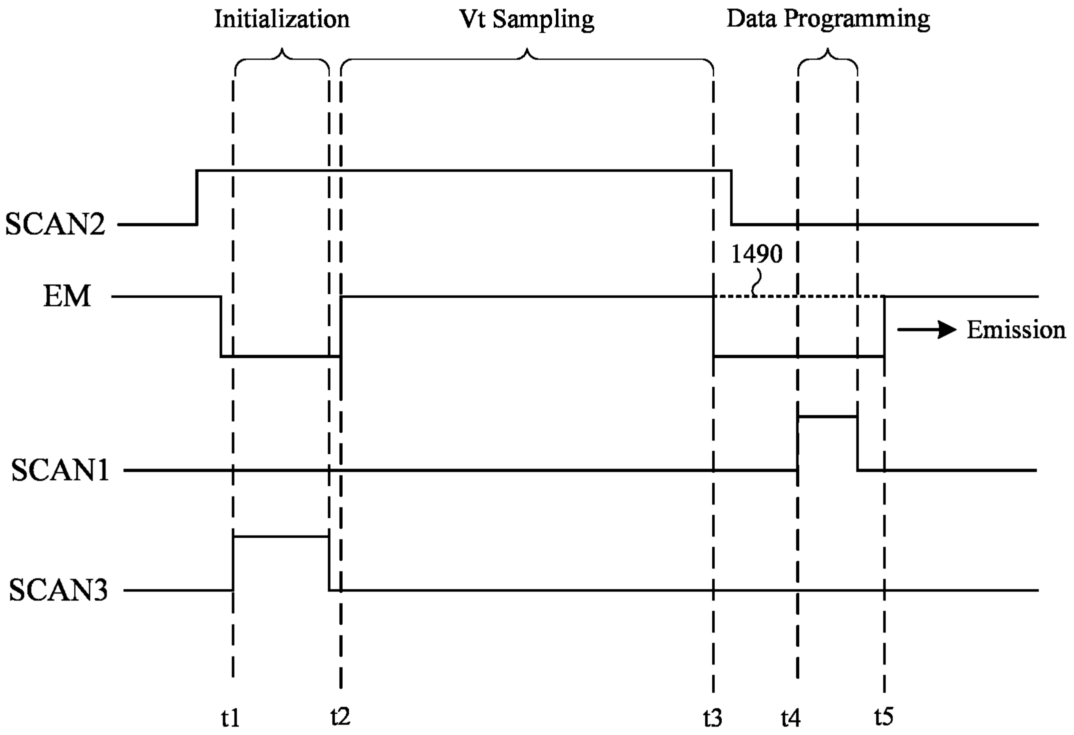
FIG. 14B is a timing diagram illustrating the behavior of relevant control waveforms during a refresh operation of the pixel shown in FIG. 13A in accordance with some embodiments.

FIG. 14B is a timing diagram illustrating the operation of display pixel 22 of the type shown in FIG. 13A. Prior to time t1, scan signal SCAN2 can be asserted (e.g., driven high) to activate (turn on) transistor Tgate. Activating transistor Tgate drives the gate terminal of transistor Tdrive to the reference voltage level Vref. At time t1, scan signal SCAN3 is temporarily pulsed high to turn on transistor Tar. Activating transistor Tar drives the source terminal of transistor Tdrive to Var. Signal EM may be temporarily turned off during the initialization phase. By activating transistor Tar, voltage Var can be applied to the source terminal of transistor Tdrive. During the initialization phase, the gate-to-source voltage Vgs of transistor Tdrive will therefore be biased to (Vref−Var). Since voltage Var is also applied directly to the source terminal of transistor Tdrive during the initialization phase, voltage Var can also serve to apply an on-bias stress to mitigate Vt hysteresis and improve first frame response. Turning off transistor Tem during the initialization phase prevents a short current path between VDDEL and Var.

From time t2 to t3, signals SCAN2 and EM are asserted. Asserting signal EM connects the drain terminal of transistor Tdrive to VDDEL. Since the drain terminal of transistor Tdrive is now directly connected to VDDEL, turning off SCAN3 at time t2 will allow the source terminal of transistor Tdrive to charge up to one Vt below the Vref level at the gate of transistor Tdrive. In other words, the source terminal of transistor Tdrive will charge up to (Vref−Vt) during the Vt sampling phase from time t2 to t3.

At time t4, scan signal SCAN1 is pulsed high to turn on transistor Tdata during the data programming phase. Activating transistor Tdata drives the gate terminal of transistor Tdrive to data voltage Vdata corresponding to a new data signal value for pixel 22. Since transistors Tar and Tem are turned off at this time, capacitor Cst cannot discharge (e.g., the voltage across capacitor Cst will remain equal to Vt even though the drive transistor gate terminal will be driven to a new Vdata level).

At time t5, emission signal EM is asserted to begin the emission phase during which diode 26 can emit an amount of light that is proportional to voltage Vdata. During the emission phase, the resulting Vgs of transistor Tdrive will be equal to [Vdata−(Vref−Vt)]. Since the final emission current is proportional to Vgs minus Vt, the emission current will be independent of Vt since (Vgs−Vt) will be equal to (Vdata−Vref+Vt−Vt), where Vt cancels out to complete the in-pixel threshold voltage canceling operation. As described above in connection with FIG. 5B, the duration of the Vt sampling phase can be independently increased relative to the duration of the data programming phase to minimize the temperature luminance sensitivity of display 14 (e.g., the duration of the Vt sampling phase can be at least 2 times, 5 times, 2-5 times, 10 times, 5-10 times, 10-20 times, or more than 20 times longer than the duration of the data programming phase).

Pixel 22 of FIG. 14A can also be used in a low refresh rate display. The vertical blanking anode reset control scheme of FIG. 12C can also be applied to pixel 22 of FIG. 14A.

The foregoing is merely illustrative and various modifications can be made to the described embodiments. The foregoing embodiments may be implemented individually or in any combination.

What is claimed is:

1. A display pixel comprising:

a light-emitting diode;

an n-type drive transistor coupled in series with the light-emitting diode between a power supply voltage and a ground voltage;

a storage capacitor coupled across a gate terminal and a source terminal of the n-type drive transistor;

an n-type gate-voltage-setting transistor having a first source-drain terminal coupled to the gate terminal of the n-type drive transistor and having a second source-drain terminal configured to receive a reference voltage;

an n-type anode reset transistor having a first source-drain terminal coupled at an anode of the light-emitting diode and having a second source-drain terminal configured to receive a reset voltage, the n-type anode reset transistor being activated a plurality of times during a vertical blanking period to reset the anode of the light-emitting diode;

an n-type data loading transistor having a first source-drain terminal coupled at the gate terminal of the n-type drive transistor and having a second source-drain terminal coupled to a data line, the n-type data loading transistor being activated during a data programming period while the n-type anode reset transistor is deactivated;

an additional capacitor having a first terminal coupled at the source terminal of the n-type drive transistor and having a second terminal configured to receive a direct current (DC) voltage different than the power supply voltage and different than the reset voltage; and an emission transistor having a first source-drain terminal coupled to the additional capacitor and having a second source-drain terminal coupled to the anode of the light-emitting diode.

2. The display pixel of claim 1, wherein the storage capacitor has a first terminal coupled at the gate terminal of the n-type drive transistor and has a second terminal coupled at the source terminal of the n-type drive transistor.

3. The display pixel of claim 1, further comprising:

an additional emission transistor having a first source-drain terminal coupled to the power supply voltage and having a second source-drain terminal coupled to the n-type drive transistor, wherein the emission transistor and the additional emission transistor are configured to receive different emission signals.

4. The display pixel of claim 3, wherein the additional emission transistor is configured to receive an emission signal that is asserted during the data programming period.

5. The display pixel of claim 1, further comprising:

an initialization transistor having a first source-drain terminal coupled to a node between the n-type drive transistor and the emission transistor and having a second source-drain terminal coupled to an initialization voltage.

6. The display pixel of claim 5, wherein the initialization transistor and the n-type anode reset transistor have gate terminals that are shorted together.

7. A display pixel comprising:

a light-emitting diode;

a parallel capacitor coupled across anode and cathode terminals of the light-emitting diode;

a semiconducting oxide anode reset transistor having a first source-drain terminal coupled at the anode terminal of the light-emitting diode and having a second source-drain terminal configured to receive an anode reset voltage, the semiconducting oxide anode reset transistor being activated a plurality of times during a vertical blanking period to reset the anode terminal of the light-emitting diode;

a semiconducting oxide drive transistor coupled in series with the light-emitting diode;

a storage capacitor coupled across a gate terminal and a source terminal of the semiconducting oxide drive transistor;

a semiconducting oxide gate-voltage-setting transistor having a first source-drain terminal coupled to the gate terminal of the semiconducting oxide drive transistor and having a second source-drain terminal configured to receive a reference voltage;

a semiconducting oxide emission transistor coupled at a drain terminal of the semiconducting oxide drive transistor and configured to receive an emission signal;

a semiconducting oxide data loading transistor having a first source-drain terminal coupled at the gate terminal of the semiconducting oxide drive transistor and having a second source-drain terminal coupled to a data line, the semiconducting oxide data loading transistor being activated during a data programming period while the semiconducting oxide anode reset transistor is deactivated; and an additional capacitor, separate from the parallel capacitor, having a first terminal coupled at the source terminal of the semiconducting oxide transistor and having a second terminal configured to receive a direct current (DC) voltage that is separate from a positive power supply voltage and the anode reset voltage.

8. The display pixel of claim 7, further comprising:

an additional semiconducting oxide emission transistor coupled at the source terminal of the semiconducting oxide drive transistor and configured to receive an additional emission signal.

9. A method of operating a display pixel comprising:

providing an emission signal to an emission transistor in the display pixel;

providing a first scan signal to a data loading transistor in the display pixel;

providing a second scan signal to a gate-voltage-setting transistor in the display pixel;

providing third scan signal to an anode reset transistor in the display pixel;

during an initialization phase, driving the emission signal low, driving the first scan signal low, driving the second scan signal high, and driving the third scan signal high; and during a vertical blanking period while the emission signal is low, performing a plurality of anode reset operations by pulsing the third scan signal.

10. The method of claim 9, further comprising:

during a threshold voltage sampling phase, driving the emission signal high and driving the third scan signal low.

11. The method of claim 10, further comprising:

during a data programming phase, driving the first scan signal high while the emission signal is driven low.

12. The method of claim 10, further comprising:

during a data programming phase, driving the first scan signal high while the emission signal is driven high.

13. The method of claim 9, further comprising:

providing an additional emission signal to an additional emission transistor in the display pixel; and during the initialization phase, driving the additional emission signal high to activate the additional emission transistor.

* * * * *